United States Patent [19]
Dill et al.

[11] 3,751,643
[45] Aug. 7, 1973

[54] SYSTEM FOR PERFORMING SPECTRAL ANALYSES UNDER COMPUTER CONTROL

[75] Inventors: Frederick H. Dill; Karl L. Konnerth, Jr., both of Putnam Valley, N.Y.

[73] Assignee: International Business Machines Corporation, Armonk, N.Y.

[22] Filed: May 23, 1972

[21] Appl. No.: 256,030

[52] U.S. Cl.......... 235/151.32, 235/151.3, 356/107, 356/161, 444/1
[51] Int. Cl.... G01b 11/06, G01b 9/02, G01b 19/08
[58] Field of Search.............. 33/1 L, 125 A, 275 R; 235/151.3, 151.32; 356/96, 97, 107, 108, 161, 188, 209; 444/1

[56] References Cited
UNITED STATES PATENTS

| | | | |
|---|---|---|---|
| 3,482,105 | 12/1969 | Hutzler | 356/97 X |
| 3,622,765 | 11/1971 | Anderson | 235/151.3 |
| 3,646,331 | 2/1972 | Lord | 235/151.3 |

OTHER PUBLICATIONS

Bey, P. P., Optical Film Tickness Monitoring, In Rev. Sci. Inst. 42(1): p. 57-60, Jan., 1971.
Campbell, R. D., Measurement of Film Thickness, In Proc. I.R.E.E. Australia, p. 102-104, April, 1967.

*Primary Examiner*—Malcolm A. Morrison
*Assistant Examiner*—R. Stephen Dildine, Jr.
*Attorney*—Charles P. Boberg et al.

[57] ABSTRACT

Measurements of physical attributes such as dielectric film thickness that are susceptible to spectral analysis are accomplished rapidly and accurately by a spectrophotometric system in which a programmed digital computer operating concurrently with the optical scanning means automatically performs the calibrating, normalizing and data reducing functions that otherwise must be carried out as time-consuming human, mechanical or analog electronic operations. The control over the optical data handling operations exercised by the computer eliminates the need for mechanically or electronically adjusting the optical apparatus to meet changing system conditions, whether periodic or aperiodic. Source light is transmitted through a rotating variable-wavelength interference filter which acts during one-half of its cycle to transmit light of varying wavelength through a fiber-optic reference path directly to the optical data acquisition apparatus, while acting in the next half-cycle to transmit light of such varying wavelength indirectly to said data acquisition apparatus through a measurement path. In the present example, where film thickness is the attribute being measured, the measurement path comprises a bifurcated fiber-optic bundle, one branch of which is used to carry the light of variable wavelength to the sample, and the other branch of which carries light reflected from the sample to the aforesaid data acquisition apparatus. A computer program enables light passed through the reference path in one half-cyle to calibrate the system for measuring optical transmission or reflectance in the next half-cycle. Reduction of relative reflectance data to absolute reflectance data (needed for the accurate determination of film thickness) is accomplished by additional computer programs whose algorithms are based upon the discovery that all graphs of absolute reflectance versus wavelength for film samples of a given material having different thicknesses are bounded by a common pair of wave envelopes.

15 Claims, 25 Drawing Figures

Patented Aug. 7, 1973
3,751,643
22 Sheets-Sheet 1
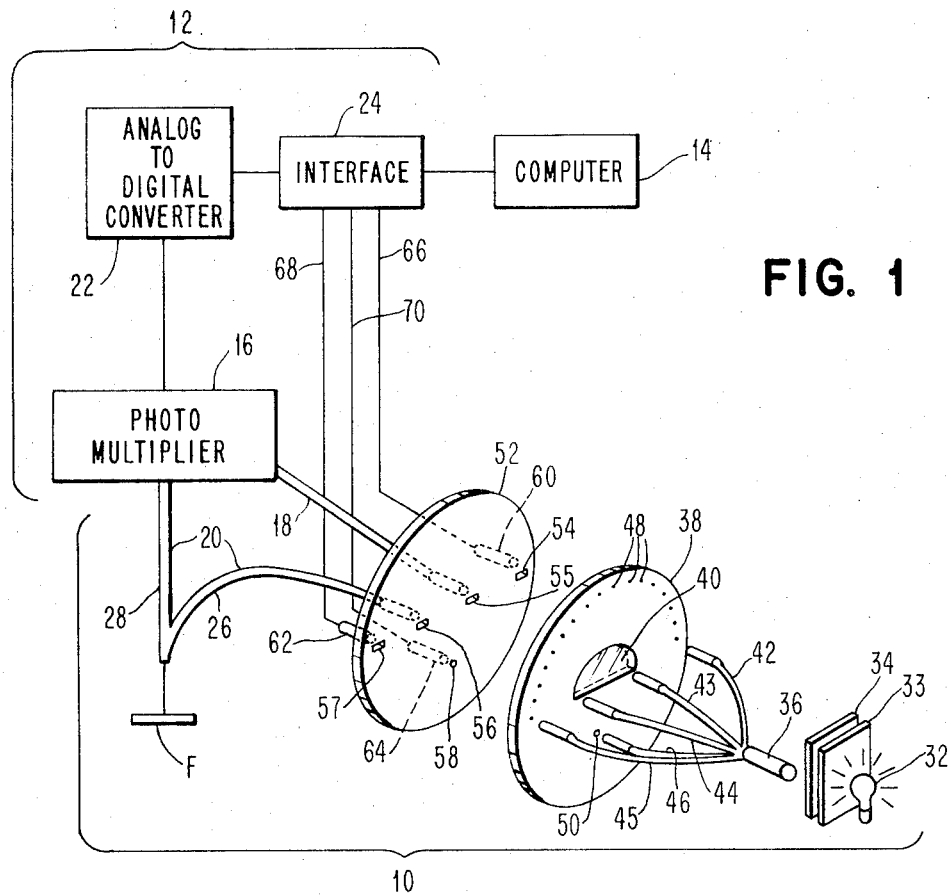
FIG. 1
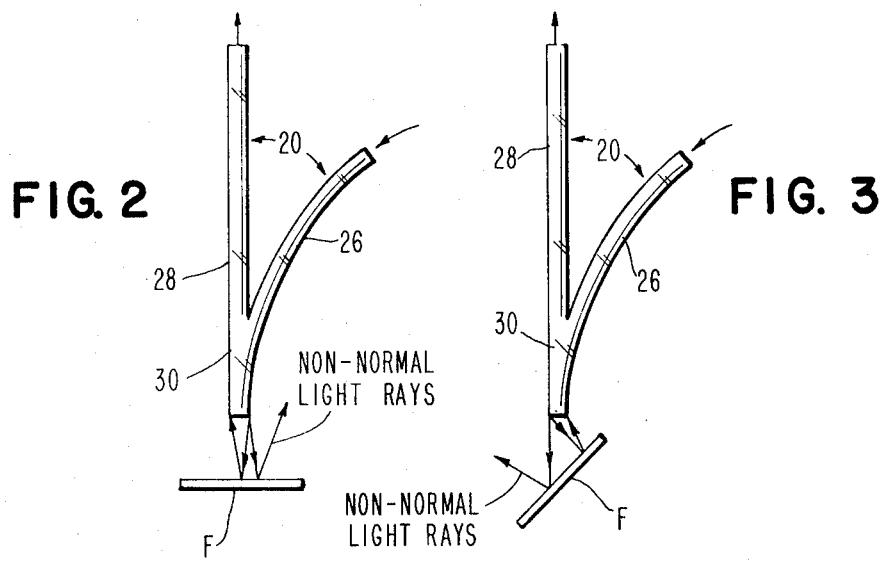
FIG. 2
FIG. 3

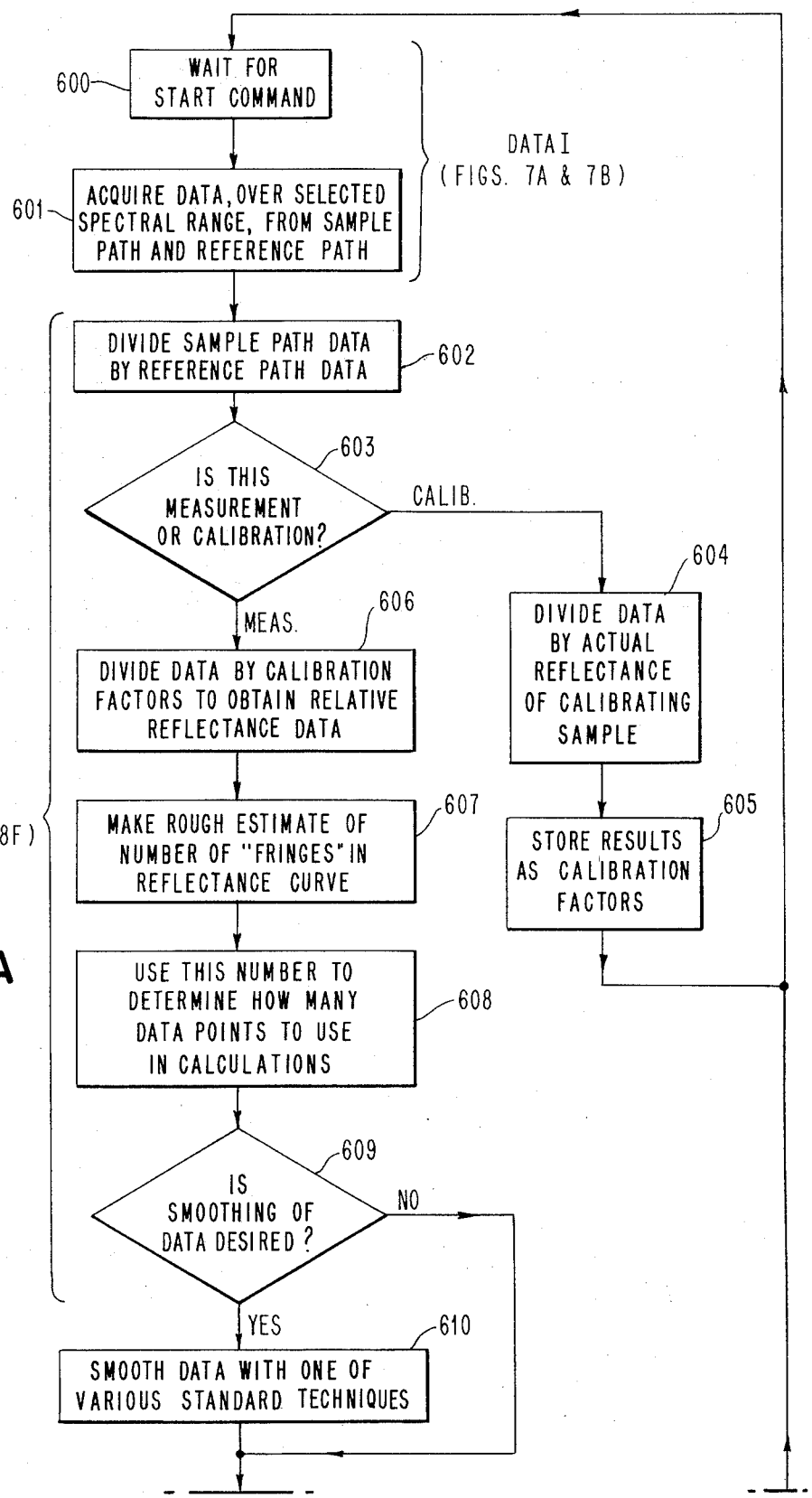

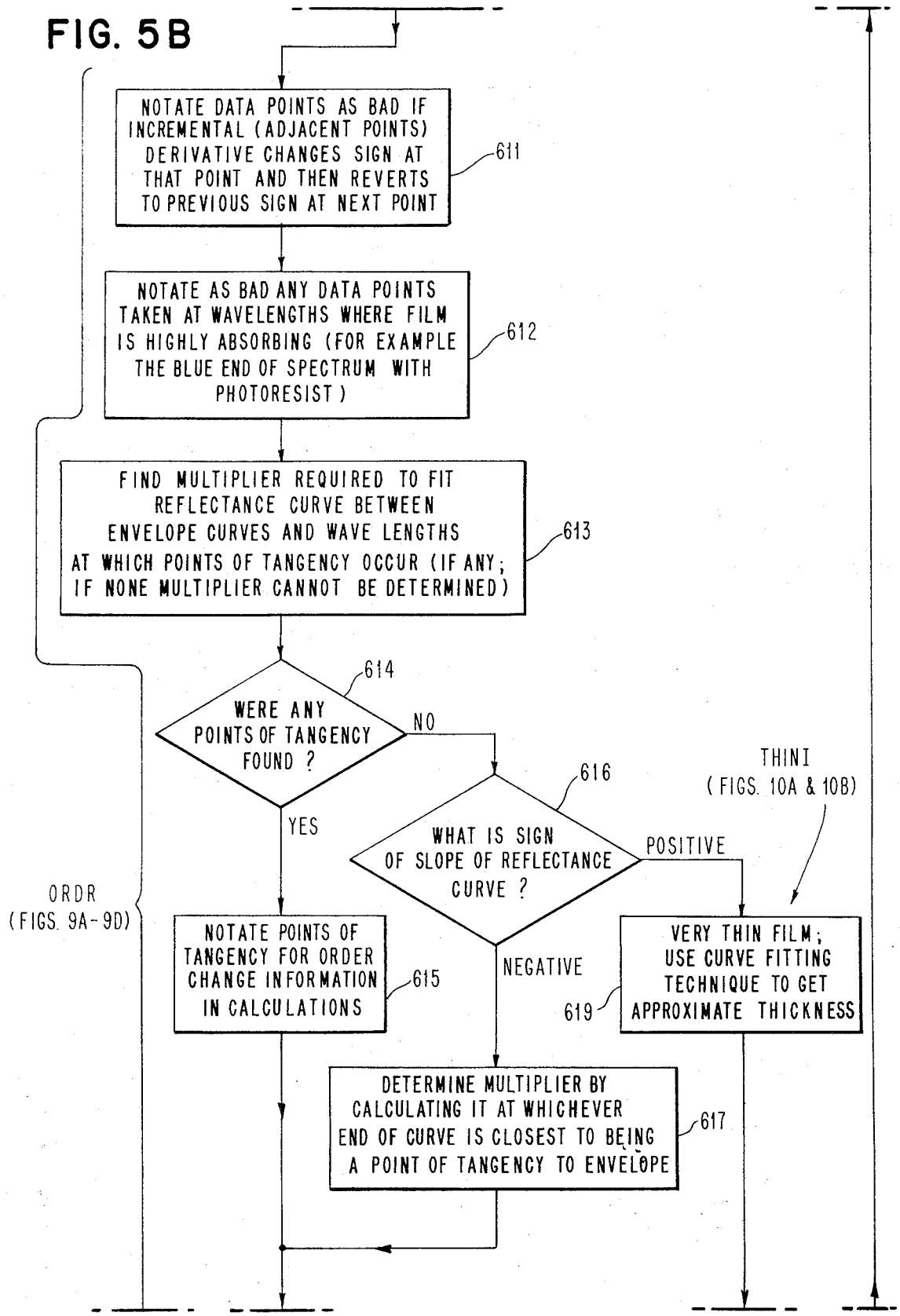

FIG. 7A

SUBROUTINE DATAI

```
**
**      THIS ROUTINE IS USED TO AQUIRE DATA
**
**              CALL DATAI(N,M,IDATA)
**      WHERE   N IS AN INTEGER INDICATING THE NUMBER
**                OF SETS OF DATA TO BE TAKEN AND ADDED
**                (LEQ 8)
**              M IS THE NUMBER OF POINTS IN A SET
**              IDATA ARE THE READINGS
**
**      THE PROGRAM HAS 3 WAITS
**              /30F0   WAITING FOR START PULSE
**              /30F1   WAITING FOR A/D CONV COMPLETE
**              /30F2   WAITING FOR END PULSE TO CHECK
**                FOR A VALID SET OF DATA
**
        ISS   18 DATAI
DATAI   BSS      1           NORMAL ENTRY
        B        BEGIN
        BSS      2
INT     DC       *-*         INTERRUPT ENTRY POINT
        XIO      SENSE
        STO      DSW         SAVE DSW FOR END CHECK
        BSC   I  INT
BEGIN   STX   L1 XR1+1       SAVE XR1
        STX   L2 XR2+1       SAVE XR2
        STS      STATS       SAVE STATUS
        LDX   I1 DATAI       PUT POINTER IN XR1
        MDM      DATAI,3     UPDATE RETURN ADDRESS
        LD    I1 0           LOAD N (NUMBER OF SETS)
        STO      SETS          AND STORE IN SETS
        LD    I1 1           LOAD M (NUMBER OF POINTS)
        STO      NPNTS         AND STORE IN NPNTS
        LD    1  2           LOAD STARTING ADDR OF IDATA
        STO      STADT         AND STORE IN STADT
        STO      LOC           AND IN LOC
        SLA      16          ZERO ACCUMULATOR
        LDX   I2 NPNTS       LOAD XR2 FOR COUNTING
LOOP1   STO   I  LOC         ZERO IDATA
        MDM      LOC,-1
        MDX   2  -1          DECREMENT COUNTER
        B        LOOP1       LOOP IF MORE
        LDX   1  20          LOAD XR1 WITH LIMITING
**                             NUMBER OF RUNS
AGAIN   MDX   1  -1          DECREMENT LIMIT COUNTER
        B        CONT        CONTINUE IF NOT EXCEEDED
        XIO      DABLB       IF EXCEEDED, DISABLE
        LD       HFFFF         INTERRUPTS AND LOAD ACC
        SRT      16      AND EXT WITH ONES
        DC       /30FF       THEN WAIT    (30FF)
EXIT    XIO      DABLB       DISABLE BOTH INTERRUPTS
STATS   LDS      *-*         RESTORE STATUS
XR1     LDX   L1 *-*         RESTORE XR1
XR2     LDX   L2 *-*         RESTORE XR2
        BSC   I  DATAI       RETURN
**
CONT    LDX   I2 NPNTS  LOAD XR2 FOR COUNTING-STORING
```

FIG. 7B

```
            XIO     NABLS       NABL INT FROM START PULSE
            DC      /30F0       WAIT FOR START INT
            XIO     NABLT       NABL A/D INT, DABLE START
     LOOP2  DC      /30F1       WAIT FOR A/D CONV COMP INT
            XIO     READ        READ A/D
            LD      RDNG        LOAD READING
            STO  L2 DATA        STORE IN DATA ARRAY
            MDX  2  -1          DECREMENT POINT COUNTER
            B       LOOP2       LOOP IF MORE DATA
            XIO     NABLB       NABL BOTH INTERRUPTS
            DC      /30F2       WAIT FOR NEXT INTERRUPT
            LD      DSW         LOAD DEVICE STATUS WORD
            BNN     AGAIN       IF NOT START INT, TRY AGAIN
**                              IF IT IS START, ADD DATA
**                                 TO IDATA
            LD      STADT       LOAD START ADDR
            STO     LOC         PUT IN LOC
            LDX  I2 NPNTS       SET UP XR2 FOR COUNTING
     LOOP3  LD   L2 DATA        LOAD PIECE OF NEW DATA
            A    I  LOC         ADD SUM TO THIS POINT
            STO  I  LOC            AND STORE NEW SUM
            MDM     LOC,-1      MODIFY LOCATION
            MDX  2  -1          DECREMENT COUNTER
            B       LOOP3       LOOP IF MORE TO ADD
            MDM     SETS,-1     DECREMENT SET COUNTER
            B       AGAIN       TAKE ANOTHER SET IF NEEDED
            B       EXIT        OTHERWISE, EXIT
**
            BSS  E
     DABLB  DC      DBOTH
            DC      /9900
     NABLB  DC      NBOTH
            DC      /9900
     SENSE  DC      0
            DC      /9F03
     NABLS  DC      START
            DC      /9900
     NABLT  DC      TWORD
            DC      /9900
     READ   DC      RDNG
            DC      /9A00
     START  DC      /0002
     TWORD  DC      /0001
     DBOTH  DC      /0000
     NBOTH  DC      /0003
     HFFFF  DC      /FFFF
     DSW    DC      *-*
     LOC    DC      *-*
     RDNG   DC      *-*
     NPNTS  DC      *-*
     STADT  DC      *-*
     SETS   DC      *-*
     DATA   BSS     361
            END     DATAI
```

FIG. 8A

SUBROUTINE THIKI

```
.........................................................................
.                                                                         .
.    THIS SUBROUTINE RETURNS A MEASURED FILM THICKNESS VALUE              .
.                                                                         .
.    THIS VERSION HAS THE OPTION FOR ITERATING ON AMXMN.                  .
.                                                                         .
.........................................................................

SUBROUTINE THIKI(AAVG,SDEV)

DIMENSION REFL(54),MDER(54),MORDR(54),IBAD(54),RFMAX(54)
      DIMENSION EDATA(2,54),IDATA(360)
      DIMENSION GOOD(54),THICK(54),FLMAX(20),FRMAX(20)
      COMMON CALIB(54),COEFH(80), COEFL(100),ALAM(54),SIGMA(54)
      COMMON R1R2S(54),TUR12(54),R1S2S(54),FMAX(54),FMIN(54),AMULT(54)
      COMMON INC,INCF,INCL,NMBR,MGO,ISW0,ISW1,ISW2,ISW3,ISW4,ISW5
      COMMON ISW6,ISW7,ISW8,ISW9,ISW10,ISW11,ISW12,ISW14
      EQUIVALENCE(EDATA(1,28),RFMAX(1),THICK(1))
      EQUIVALENCE(EDATA(1,1),REFL(1))
      EQUIVALENCE(IDATA(1),GOOD(1),FLMAX(1)),(IDATA(41),FRMAX(1))
      EQUIVALENCE(IDATA(109),MDER(1)),(IDATA(163),MORDR(1))
      EQUIVALENCE(IDATA(217),IBAD(1))
      EQUIVALENCE(EDCMX,AMAX,AVGPD,SUM,DEV)
      EQUIVALENCE(EDCMN,AMIN,AVGMD,AMXMN),(EDDMN,AVG)

INITIALIZE VARIOUS QUANTITIES

AAVG=0.
      SDEV=1.E36
      IBRCH=2

ACQUIRE DATA

CHECK ISW1 TO SEE IF EVERY 1 OR 3 DEGREE MODE TO BE USED

GO TO (25,15),ISW1

DATA POINT EVERY THREE DEGREES OF ROTATION

15 CALL DATAI(4,120,IDATA)
      DO 20 I=1,54
      EDATA(1,I)=IDATA(I+63)/4.
   20 EDATA(2,I)=IDATA(I+3)/4.
      GO TO 35

DATA POINT EVERY DEGREE OF ROTATION BUT USING ONLY THE 54
      POINTS AT THE RED END OF THE SPECTRUM (FOR THICK FILMS)

25 CALL DATAI(4,360,IDATA)
      DO 30 I=1,54
      EDATA(1,I)=IDATA(I+296)/4.
   30 EDATA(2,I)=IDATA(I+116)/4.

CALCULATE CALIBRATION AND DATA MAXIMA AND MINIMA
```

FIG. 8B

```
35 EDCMX=0.
   EDCMN=1.E35
   EDDMX=0.
   EDDMN=1.E35
   DO 50 I=1,54
   IF(EDATA(2,I)-EDCMX)    43,43,42
42 EDCMX=EDATA(2,I)
43 IF(EDATA(2,I)-EDCMN)    44,45,45
44 EDCMN=EDATA(2,I)
45 IF(EDATA(1,I)-EDDMX)    47,47,46
46 EDDMX=EDATA(1,I)
47 IF(EDATA(1,I)-EDDMN)    48,50,50
48 EDDMN=EDATA(1,I)
50 CONTINUE

WRITE MESSAGE IF SIGNAL TOO LARGE OR TOO SMALL

IF(EDCMN-30.) 54,51,51
51 IF(EDDMN-30.) 54,52,52
52 IF(EDCMX-4070.) 53,53,55
53 IF(EDDMX-4070.) 56,56,55
54 WRITE(1,504) EDCMN,EDDMN
   GO TO 52
55 WRITE(1,506) EDCMX,EDDMX
   RETURN

TYPE CALIBRATION AND DATA MAXIMA AND MINIMA IF ISW2 = 1

56 GO TO (57,58),ISW2
57 WRITE(1,501) EDCMX,EDCMN,EDDMX,EDDMN

IF ISW0 = 1, DATA IS TREATED AS A CALIBRATION ON BARE SILICON
   AND THE CALIBRATION FACTORS COMPUTED AND STORED ON DISK AND THEN
   RETURN IS MADE TO CALLING PROGRAM

58 GO TO (59,65),ISW0
59 DO 60 I=1,54
60 CALIB(I)=(EDATA(2,I)/EDATA(1,I))*FMAX(I)
   GO TO (64,62),ISW1
62 WRITE(1'3) CALIB
   WRITE(1,508)
   RETURN
64 WRITE(1'4) CALIB
   WRITE(1,509)
   RETURN

IF ISW0 = 2, DATA IS TREATED AS A MEASUREMENT AND THE
   REFLECTIVITY IS CALCULATED

65 DO 70 I=1,54
70 REFL(I)=(EDATA(2,I)/EDATA(1,I))/CALIB(I)

MAKE A ROUGH ESTIMATE OF THE NUMBER OF MAXIMA IN THE REFLECTIVITY
   CURVE AND FROM THIS DECIDE HOW MANY DATA POINTS SHOULD BE USED
   AND IF THE SMOOTHING ROUTINE SHOULD BE USED

AMAX=0.
```

FIG. 8C

```
      AMIN=1.E30
      ISMTH=2
      DO 80 I=1,54
      RFMAX(I)=REFL(I)*FMAX(I)
      IF(RFMAX(I)-AMAX) 74,74,73
   73 AMAX=RFMAX(I)
   74 IF(RFMAX(I)-AMIN) 75,80,80
   75 AMIN=RFMAX(I)
   80 CONTINUE
      IF(AMAX-2.*AMIN) 116,85,85
   85 KOUNT=0
      AVG=(AMAX+AMIN)/2.
      DELTA=.1*(AMAX-AMIN)
      AVGPD=AVG+DELTA
      AVGMD=AVG-DELTA
      DO 90 I=1,54
      IF(RFMAX(I)-AVGPD) 87,87,92
   87 IF(RFMAX(I)-AVGMD) 94,90,90
   90 CONTINUE
   92 IFLAG=1
      GO TO 96
   94 IFLAG=-1
   96 ISTRT=I+1
      IF(I-1) 98,98,97
   97 KOUNT=1
   98 DO 110 I=ISTRT,54
      IF(IFLAG) 104,102,102
  102 IF(RFMAX(I)-AVGMD) 103,110,110
  103 IFLAG=-1
      KOUNT=KOUNT+1
      GO TO 110
  104 IF(RFMAX(I)-AVGPD) 110,110,105
  105 IFLAG=1
      KOUNT=KOUNT+1
  110 CONTINUE
      IF(KOUNT-1) 116,112,112
  112 IF(KOUNT-4) 118,118,114
  114 IF(KOUNT-6) 124,124,122
  116 INC=3
      GO TO 126
  118 INC=2
      GO TO 126
  122 ISMTH=1
  124 INC=1
  126 INCF=INC+INC
      INCL=54-INC
      NMBR=54/INC

GO TO OR SKIP SMOOTHING ROUTINE DEPENDING UPON VALUE OF ISMTH

GO TO (137,133),ISMTH
  133 CALL SE35(REFL,REFL)

137 CALL ORDR(IBAD,REFL,MDER,NORDR,JGO,MORDR,AMXMN,RFMAX,FLMAX,FRMAX,
     *KRMAX)

CHECK TO SEE IF THIS IS AN SIO2 MEASUREMENT.  IF NOT, FIT DATA
```

FIG. 8D

```
      TO TOP CURVE ONLY.
      IF(MGO-1)    143,177,143
143 IF(KRMAX)    177,177,145
145 CALL LSQ2(FLMAX,FRMAX,KRMAX,C0,C1,C2
    DO 150 I=1,54
150 REFL(I)=REFL(I)/(C0+C1*ALM(I)+ALM(I))
    AMXMN=1.

MAKE SURE THERE AREN'T SO MANY BAD POINTS THAT THE DATA IS USELESS
      FOR THE NORMAL ROUTINE.  IF THERE ARE, TRY THE THIN ROUTINE

177 IBADS=0
    DO 275 I=INC,54,INC
275 IBADS=IBADS+IBAD(I)
    IF(IBADS-1-NMBR/2) 280,277,277
277 WRITE(1,531)
    GO TO 286

IF THERE IS NO MAXIMUM OR MINIMUM IN THE DATA AND WE ARE NOT IN
      THE 1300 ANGSTROM REGION THEN GO TO THIN ROUTINE

280 GO TO (285,300),JGO
285 WRITE(1,503)

286 CALL THINI(REFL,AAVG,AMXMN)
    IF(AAVG) 287,287,290

IF THE THIN ROUTINE DOES NOT GIVE A POSITIVE ANSWER, WRITE MESSAGE
      SET ANSWER TO ZERO AND RETURN

287 WRITE(1,530)
288 AAVG=0.
289 RETURN

CHECK TO SEE WHETHER MULTIPLIER ADJUSTMENT IS TO BE USED

290 GO TO (291,289),ISW14
291 DELTA=.05*AMXMN
    AMXMN=1.2*AMXMN
    NORDR=1
    SDEV=1.E36
    IBRCH=1
    DO 297 I=INC,54,INC
297 MDER(I)=1
      IF THE DATA LOOKS OK CALCULATE THE ARCCOS TERM IN THE EQUATION
      FOR THE THICKNESS AND THE FIRST CALCULATION OF THICKNESS

300 DO 310 I=INCF,INCL,INC
    IF(IBAD(I)) 307,307,310
307 REF=REFL(I)/AMXMN
    COSIN=(REF+REF*R1R2S(I)-R1S2S(I))/((REF-1.)*TUR12(I))
    IF(COSIN-1.) 301,301,302
301 IF(COSIN+1.) 303,304,304
302 ANGLE=0.
    GO TO 308
303 ANGLE=3.14159265
```

FIG. 8E

```
      GO TO 306
304   ANGLE=ACOS(COSIN)
306   IF(MDER(I)) 308,308,305
305   ANGLE=-ANGLE
308   THICK(I)=(ANGLE+(MORDR(I)+NORDR-1)*6.28318531+SIGMA(I))*AMULT(I)
310   CONTINUE
```

CALCULATE THE THICKNESS AT ALL GOOD POINTS FOR THE PRESENT STARTING ORDER (NORDR), AVERAGE THESE AND CALCULATE STANDARD DEVIATION

```
401   KOUNT=0
      SUM=0.
      DO 410 I=INCF,INCL,INC
405   THICK(I)=THICK(I)+6.28318531*AMULT(I)
      IF(IBAD(I)) 405,405,410
      KOUNT=KOUNT+1
      GOOD(KOUNT)=THICK(I)
      SUM=SUM+THICK(I)
410   CONTINUE
      AVG=SUM/KOUNT
      DEV=0.
      DO 420 I=1,KOUNT
      X=GOOD(I)-AVG
420   DEV=DEV+X*X
      DEV=SQRT(DEV/KOUNT)
```

BRANCH DEPENDENT UPON WHETHER ITERATION IS TO BE DONE ON NORDR OR AMXMN

```
      GO TO (452,425),IBRCH
```

COMPARE STD DEV TO THAT FROM PREVIOUS ATTEMPT (OR TO INITIAL STD DEV VALUE OF 1.E36 IF FIRST ATTEMPT). IF NEW VALUE IS SMALLER THAN OLD, INCREMENT NORDR AND TRY AGAIN. IF LARGER, SETTLE FOR THIS RESULT

```
425   IF(DEV-SDEV) 429,434,434
429   AAVG=AVG
      SDEV=DEV
      NORDR=NORDR+1
```

IF NO SOLUTION IS FOUND TO ORDER 40, TYPE MESSAGE AND RETURN

```
      IF(NORDR-40) 401,401,431
431   WRITE(1,505)
      GO TO 288
```

IF STD DEV GETS TOO LARGE, TRY THE THIN ROUTINE

```
434   IF(300.-SDEV) 435,436,436
435   WRITE(1,507) AAVG,SDEV
      GO TO 286
```

BRANCH DEPENDENT UPON WHETHER AMXMN ITERATION IS NOW TO BE USED

```
436   GO TO (438,289),ISW14
```

FIG. 8F

```
      IF SO, SET UP FOR THE ITERATION

438 DELTA=.045*AMXMN
      AMXMN=1.2*AMXMN
      SDEV=1.E36
      NORDR=NORDR-1
      IBRCH=1
      GO TO 300

REGION IN WHICH TESTING IS DONE FOR AMXMN ITERATION

452 IF(DEV-SDEV) 453,461,461
  453 AAAVG=AAVG
      SSDEV=SDEV
      AAVG=AVG
      SDEV=DEV
      IF(AMXMN-2.) 455,455,457
  455 AMXMN=AMXMN-DELTA
      GO TO 300
  457 WRITE(1,530)
      GO TO 288

461 CALL PRAB(AAAVG,AAVG,AVG,SSDEV,SDEV,DEV,X,Y)
      AAVG=X
      SDEV=Y
      GO TO 289

501 FORMAT(4F10.2/)
  503 FORMAT('NO MAX/MIN--TRY THIN')
  504 FORMAT('PMT OUT LO',2F10.0)
  505 FORMAT('NO SOLN FOUND--RSLT SET=0')
  506 FORMAT('PMT OUT TOO HI',2F10.0)
  507 FORMAT('SCATTER TOO LRG--TRY THIN',2F10.0)
  508 FORMAT('END MOD 3 CAL')
  509 FORMAT('END 1 DEGREE CAL')
  530 FORMAT('NO MEANINGFUL SOLN--RSLT SET=0')
  531 FORMAT('TOO MANY BAD PNTS--TRY THIN')
      END
```

FIG. 9A

SUBROUTINE ORDR

```
**********************************************************
*                                                        *
*  THIS SUBROUTINE IS USED AS PART OF THE FILM THICKNESS PROGRAM. *
*  TO NOTATE BAD POINTS, FIND ORDER CHANGES, FIND DERIVATIVE *
*  CHANGES AND FIND THE MULTIPLYING FACTOR TO NORMALIZE THE *
*  DATA                                                   *
*                                                        *
**********************************************************

SUBROUTINE ORDR(KBAD,REFL,MDER,NORDR,JGO,MORDR,AMXMN,RFMAX,FLMAX,
     *FRMAX,KRMAX)

DIMENSION IBAD(54),REFL(54),IDER(54),MORDR(54),JDER(54),RFMAX(54)
      DIMENSION RFMIN(54),JBAD(54),KBAD(54),FLMAX(20),FRMAX(20)
      DIMENSION KDER(54),MDER(54)
      COMMON CALIB(54),COEFH(80), COEFL(100),ALAM(54),SIGMA(54)
      COMMON R1R2S(54),TUR12(54),R1S2S(54),FMAX(54),FMIN(54),AMULT(54)
      COMMON INC,INCF,INCL,NMBR,MGO,ISW0,ISW1,ISW2,ISW3,ISW4,ISW5
      COMMON ISW6,ISW7,ISW8,ISW9,ISW10,ISW11,ISW12,ISW14
      EQUIVALENCE(JDER(1),KDER(1))

FIND RFMNX, I.E., THE MAXIMUM VALUE OF RFMIN(I)=REFL(I)*FMIN(I)
      FIND RFMXN, I.E., THE MINIMUM VALUE OF RFMAX(I)=REFL(I)*FMAX(I)

RFMXN=1.E30
      RFMNX=0.
      DO 30 I=1,54
   30 RFMIN(I)=REFL(I)*FMIN(I)
      DO 50 I=INC,54,INC
      IF(RFMIN(I)-RFMNX)   45,45,44
   44 RFMNX=RFMIN(I)
   45 IF(RFMAX(I)-RFMXN)   46,50,50
   46 RFMXN=RFMAX(I)
   50 CONTINUE

FIND THE INCREMENTAL (ADJACENT USED POINT) DERIVATIVE OF RFMAX AND
      RFMIN AND STORE AS 1 AND 0 IN IDER AND JDER, RESPECTIVELY
      ALSO INITIALIZE KBAD(I) TO 0

IDER(INC)=1
      JDER(INC)=1
      DO 60 I=INCF,54,INC
      KBAD(I)=0
      IMINC=I-INC
      IF(RFMAX(I)-RFMAX(IMINC))   52,53,54
   52 IDER(I)=0
      GO TO 55
   53 IDER(I)=IDER(IMINC)
      GO TO 55
   54 IDER(I)=1
   55 IF(RFMIN(I)-RFMIN(IMINC))   56,57,58
   56 JDER(I)=0
      GO TO 60
   57 JDER(I)=JDER(IMINC)
      GO TO 60
   58 JDER(I)=1
```

FIG. 9B

```
 60 CONTINUE
    IDER(INC)=IDER(2*INC)
    JDER(INC)=JDER(2*INC)

NOTATE BAD POINTS OF RFMAX AND RFMIN IN IBAD AND JBAD, RESP.
    0 DENOTES GOOD AND 1 DENOTES BAD (MEANING THAT THE DERIVATIVE HAS
    CHANGED SIGN 3 TIMES BETWEEN 4 USED DATA POINTS)

DO 70 I=INCF,INCL,INC
    IMINC=I-INC
    IPINC=I+INC
    IF(IDER(I)-IDER(IMINC))    61,62,61
 61 IF(IDER(I)-IDER(IPINC))    63,62,63
 62 IBAD(I)=0
    GO TO 64
 63 IBAD(I)=1
    IDER(I)=IDER(IMINC)
 64 IF(JDER(I)-JDER(IMINC))    65,66,65
 65 IF(JDER(I)-JDER(IPINC))    67,66,67
 66 JBAD(I)=0
    GO TO 70
 67 JBAD(I)=1
    JDER(I)=JDER(IMINC)
 70 CONTINUE

IF ANY OF ISW3 THRU ISW10 = 1 (INDICATING PHOTORESIST MEASUREMENT
    AND ISW1 = 2 (INDICATING MEASUREMENT UNDER ABOUT 20,000
    ANGSTROMS, I.E., EVERY 3 DEGREES USED ON FILTER) NOTATE THE
    FIRST 12 DATA POINTS AS BAD DUE TO LARGE ABSORPTION IN THAT
    REGION

GO TO (225,210),ISW1
210 GO TO (225,215,215,215,215,225,225),MGO
215 DO 220 I=1,12
    IBAD(I)=1
    JBAD(I)=1
220 KBAD(I)=1

INITIALIZE VARIOUS PARAMETERS
    MCONT=NUMBER OF POINTS OF TANGENCY TO ENVELOPE CURVES
    DIVSR---USED TO WEIGHT POINTS OF TANGENCY TO TOP ENVELOPE CURVE
            MORE HEAVILY THAN TO BOTTOM FOR NUMEROUS REASONS
    AMAX=ACCUMULATED WEIGHTED MULTIPLYING FACTORS
    KRMAX=NUMBER OF POINTS OF TANGENCY TO TOP ENVELOPE CURVE.  THIS IS
           USED FOR PHOTORESIST CALCULATIONS
    FRMAX(I)=RFMAX AT TANGENCY POINTS TO TOP ENVELOPE
    FLMAX(I)=WAVELENGTH AT TANGENCY POINTS TO TOP ENVELOPE
    JFLAG=INDICATOR AS TO WHETHER LAST POINT OF TANGENCY WAS TO TOP
           ENVELOPE CURVE (0), BOTTOM (1) OR NOT KNOWN (-1)

225 MCONT=0
    DIVSR=0.
    AMAX=0.
    KRMAX=0
    JFLAG=-1

FIND POINTS OF TANGENCY TO ENVELOPE CURVES (IF ANY) BY FINDING
```

RELATIVE MAXIMA OF RFMAX AND RELATIVE MINIMA OF RFMIN, NEGLECTING
POINTS NOTATED AS BAD IN IBAD OR JBAD AND UNDER THE CONSTRAINTS
THAT THE POINTS OF TANGENCY MUST ALTERNATE BETWEEN THE ENVELOPE
CURVES AND THAT THEY MUST BE WITHIN A SPECIFIED FACTOR OF THE
ABSOLUTE OF RFMAX AND RFMIN (TO AVOID TREATING NOISE NEAR A MINIMA
AS A MAXIMA, ETC.). A PARABOLIC FIT IS DONE TO THE 3 POINTS
NEAREST THE TANGENCY POINTS. THE MIDDLE POINT OF THESE 3 IS
NOTATED AS BAD (IN KBAD) TO AVOID CALCULATING WHICH SIDE OF
TANGENCY POINT IT IS ON. FIRST AND LAST POINTS ALSO NOTATED AS
BAD SINCE ORDER CANNOT BE EASILY DETERMINED FOR THEM.

ORDER CHANGES (POINTS OF TOP TANGENCY) ARE NOTATED IN MORDR

TRUE LOCAL INCREMENTAL DERIVATIVE OF ACTUAL CURVE NOTATED IN
KDER FOR LATER USE IN DETERMINING THE PROPER SIGN OF ARCCOS

FIG. 9C

```
      DO 100 I=INCF,INCL,INC
      IMINC=I-INC
      IPINC=I+INC
      IF(IBAD(I)) 71,71,85
   71 IF(RFMAX(I)-1.5*RFMXN) 85,72,72
   72 IF(RFMAX(I)-RFMAX(IMINC)) 85,74,74
   74 IF(RFMAX(I)-RFMAX(IPINC)) 85,76,76
   76 IF(JFLAG) 78,98,78
   78 JFLAG=0
      MCONT=MCONT+1
      KRMAX=KRMAX+1
      DIVSR=DIVSR+7.5
      CALL PRAB(ALAM(IMINC),ALAM(I),ALAM(IPINC),RFMAX(IMINC),RFMAX(I),RF
     *MAX(IPINC),X,Y)
      AMAX=AMAX+7.5*Y
      FRMAX(KRMAX)=Y
      FLMAX(KRMAX)=X
      GO TO 98
   85 IF(JBAD(I)) 86,86,99
   86 IF(RFMIN(I)-.65*RFMNX) 87,87,99
   88 IF(RFMIN(I)-RFMIN(IPINC)) 92,92,99
   87 IF(RFMIN(I)-RFMIN(IMINC)) 88,88,99
   92 IF(JFLAG) 94,94,98
   94 JFLAG=1
      MCONT=MCONT+1
      DIVSR=DIVSR+1.
      CALL PRAB(ALAM(IMINC),ALAM(I),ALAM(IPINC),RFMIN(IMINC),RFMIN(I),RF
     *MIN(IPINC),X,Y)
      AMAX=AMAX+Y
   98 KBAD(I)=1
   99 MORDR(I)=-KRMAX
      KDER(I)=JFLAG
  100 CONTINUE
      KBAD(INC)=1
      KBAD(54)=1
      KDER(INC)=KDER(INCF)
      KDER(54)=KDER(INCL)
      MORDR(INC)=MORDR(INCF)
      MORDR(54)=MORDR(INCL)
```

MAKE STARTING ESTIMATE OF ORDER AT SHORT WAVELENGTH END OF CURVE

```
      IF(MORDR(54)) 103,104,103
103 NORDR=MCONT*(3-ISW1)
      GO TO 106
104 NORDR=0
```

FIG. 9D

```
      CHECK TO SEE IF ANY POINTS OF TANGENCY WERE FOUND

106 IF(MCONT) 108,108,126

IF NONE, DECIDE WHETHER WE ARE IN NARROW REGION WITH THOSE
      PROPERTIES AROUND 1300 ANGSTROMS OR IN REGION LESS THAN 700
      ANGSTROMS BY LOOKING AT SIGN OF SLOPE OF DATA

108 IDERS=0
      DO 110 I=INCF,INCL,INC
110 IDERS=IDERS+IDER(I)*(1-IBAD(I))
      IF(IDERS-5) 113,113,120

IF WE ARE AROUND 1300 ANGSTROMS, SEE WHICH END OF SPECTRUM
      GIVES DATA WHICH IS CLOSEST TO TANGENCY POINT AND CALCULATE
      APPROPRIATE MULTIPLYING FACTOR.

113 IDERV=0
      IF(ABS(RFMAX(1)-RFMAX(3))-ABS(RFMIN(52)-RFMIN(54))) 116,116,119
116 AMXMN=(RFMAX(1)+RFMAX(2))/2.
      GO TO 152
119 AMXMN=(RFMIN(53)+RFMIN(54))/2.
      GO TO 152

IF NO POINTS OF TANGENCY IN DATA AND WE ARE NOT NEAR 1300
      ANGSTROMS, SEE IF WE ARE VERY NEAR POINT OF TANGENCY AT SHORT
      WAVELENGTH END OF CURVE.  IF SO, CALCULATE MULTIPLYING FACTOR
      AND CONTINUE.  IF NOT, SET FLAG FOR THIN ROUTINE AND RETURN

120 A=RFMIN(1)+RFMIN(2)+RFMIN(3)
      B=RFMIN(4)+RFMIN(5)+RFMIN(6)
      IF(A-.97*B) 122,121,121
121 IDERV=1
      AMXMN=A/3.
      GO TO 152
122 JGO=1
      RETURN

IF POINT(S) OF TANGENCY EXIST CALCULATE MULTIPLIER

126 AMXMN=AMAX/DIVSR

ADJUST DERIVATIVE INFORMATION AND STORE TO BE RETURNED IN MDER
      FOR CHOOSING SIGN OF ARCCOS IN PROGRAM THIK.

DO 130 I=INC,54,INC
      IF(KDER(I)) 130,132,132
130 CONTINUE
132 ISTOP=I-INC
      ISET=1-KDER(I)
      DO 140 I=INC,54,INC

IF(I-ISTOP) 134,134,137
134 MDER(I)=ISET
      GO TO 140
137 MDER(I)=KDER(I)
140 CONTINUE
143 JGO=2
      RETURN

152 DO 160 I=INC,54,INC
160 MDER(I)=IDERV
      GO TO 143
      END
```

FIG. 10A

SUBROUTINE THINI

```
...............................................................
.                                                             .
.     THIS ROUTINE IS USED TO CALCULATE FILM THICKNESSES LESS .
.     THAN ABOUT 750 ANGSTROMS.  IT IS ONLY FOR SIO2 ON SILICON.
.     IT OPERATES ON THE PRINCIPLE OF QUADRATIC LEAST SQUARE FITS.
.     WITH THE REFLECTIVITY BEING NORMALIZED IN TWO DIFFERENT WAYS.
.     FOR TWO DIFFERENT RANGES TO OVERCOME DOUBLE VALUED PROBLEMS.
.                                                             .
.     IF NO SOLUTION IS FOUND, -1000. IS RETURNED             .
.     IF ILLEGAL MATERIAL COMBINATION, 0 IS RETURNED          .
.                                                             .
.     AMXMN IS THEN ESTIMATED BY COMPARING THE REFLECTIVITY   .
.     AVERAGE TO THE THEORETICAL AVERAGE FOR THE THICKNESS    .
.     DETERMINED.  THIS IS FOR USE WITH THE AMXMN ITERATION   .
.                                                             .
...............................................................

SUBROUTINE THINI(REFL,THICK,AMXMN)

DIMENSION REFL(54),AL(46),RA(46)
      COMMON CALIB(54),COEFH(80), COEFL(100),ALAM(54),SIGMA(54)
      COMMON R1R2S(54),TUR12(54),R1S2S(54),FMAX(54),FMIN(54),AMULT(54)
      COMMON INC,INCF,INCL,NMBR,MGO,ISW0,ISW1,ISW2,ISW3,ISW4,ISW5
      COMMON ISW6,ISW7,ISW8,ISW9,ISW10,ISW11,ISW12,ISW14
      EQUIVALENCE(AL(1),ALAM(5))

THAVG(X)=.3711+X*9.378E-5-X*X*9.849E-7+X*X*X*6.194E-10

IF(MGO-1) 111,1,111
    1 SUM=0.
      DO 10 I=1,46
   10 SUM=SUM+REFL(I+4)
      AVG=SUM/46.
      BMULT=3.*AVG/45.
      DO 20 I=1,46
   20 RA(I)=REFL(I+4)/(AVG+BMULT*(46-I))
      CALL LSQ2(AL,RA,46,C0,C1,C2)
      IF(C0-COEFH(1)) 41,41,25
   25 DO 30 I=2,40
      IF(C0-COEFH(I)) 33,33,30
   30 CONTINUE
      GO TO 99
   33 IF(ABS(C1-COEFH(I+40))-ABS(.2*COEFH(I+40))) 37,99,99
   37 THICK=440.+10.*(I-1)+10*((C0-COEFH(I-1))/(COEFH(I)-COEFH(I-1)))
      GO TO 150
```

```
   41 DO 50 I=1,46
   50 RA(I)=REFL(I+4)/AVG
      CALL LSQ2(AL,RA,46,C0,C1,C2)
      IF(C0-COEFL(50)) 99,99,53
   53 DO 60 I=1,49
      J=50-I
      IF(C0-COEFL(J)) 63,63,60
   60 CONTINUE
      GO TO 99
   63 IF(ABS(C1-COEFL(J+50))-ABS(.2*COEFL(J+50))) 67,99,99

67 THICK=10*J+10*((C0-COEFL(J))/(COEFL(J+1)-COEFL(J)))
      GO TO 150

99 THICK=-1000.
      GO TO 150

111 THICK=0.
      WRITE(1,501)

150 SUM=0.
      DO 160 I=1,54
  160 SUM=SUM+REFL(I)
      AVG=SUM/54.
      AMXMN=AVG/THAVG(THICK)
      RETURN

501 FORMAT('THIN N/A THIS MATRL')
      END
```

FIG. 10B

SYSTEM FOR PERFORMING SPECTRAL ANALYSES UNDER COMPUTER CONTROL

BACKGROUND OF THE INVENTION

1. Field of the Invention

The invention relates generally to optical measuring techniques which employ spectrophotometers and the like. Specifically, it relates to the measurement of dielectric film thickness by observing the variation of interference effects produced by varying the wavelength of the incident light.

2. Description of the Prior Art

A technique commonly used for measuring the thickness of a thin dielectric film (e.g., silicon dioxide, silicon nitride, or photoresists used on silicon in the fabrication of integrated circuits) is to observe the manner in which the intensity of light reflected from the film and its substrate varies due to optical interference effects as the wavelength of the incident light is varied. For given film and substrate materials, the distance between adjacent maximum or minimum points on the reflectance curve is theoretically a function of film thickness. In practice, however, there are likely to be deviations from the theoretical relationship due to the variation of the indices of refraction of the film and substrate with optical wavelength. In addition, unless the spectrophotometer is fully corrected for spectral variation of its light source, aging of its electronic components, mechanical wear, and calibration of its optical paths, further deviations from theory occur. In the conventional measurement, the locations of the maximum and minimum points are read by a human from the curve plotted by the spectrophotometer. These data points are then used to calculate the thickness of the dielectric film. While this method only requires relative reflectivity (rather than absolute reflectivity) in order to make the measurement, it requires intervention of a human to find the maximum and minimum points (with the associated unreliability and inaccuracy of human observers) and also utilizes only a small amount of the measured data while demanding equal accuracy at all points. In the conventional spectrophotometric system used for this purpose, the optical apparatus has numerous electrically and mechanically adjustable parts which must be adjusted both periodically and aperiodically to compensate for system variations of the kind mentioned above. All of these adjusting, compensating and calculating functions customarily are accomplished by time-consuming human and mechanical operations, which greatly impede the measurement of film thicknesses.

SUMMARY OF THE INVENTION

An object of the present invention is to relieve both the optical apparatus and the human operator of the need to perform mechanical adjustments and complex off-line calculations, thereby simplifying the construction of the optical apparatus, reducing the job requirements of the operator and greatly speeding up the measurement process. This objective is accomplished by a novel system design which enables a programmed digital computer to make instantaneous interpretive or compensating adjustments of the acquired optical data as needed in lieu of the cumbersome adjusting techniques conventionally employed for this purpose as described above. Among the features of the present system which enable it to operate in this efficient computer-controlled mode are the following:

Visible light from a light source is passed through a rotating variable-wavelength interference filter which is effective in one half of its rotation to pass a variable-wavelength monochromatic beam through a reference path to a photomultiplier in the data acquisition circuitry and is effective in the next half-cycle to direct such a beam through a sample measurement path. This sample measurement path comprises a bifurcated fiber-optic bundle, one branch of which directs the variable-wavelength light onto the film sample to be measured, and the other branch of which passes light reflected from the sample to the aforesaid photomultiplier. The computer, which processes digitized versions of the optical data acquired by the photo-multiplier through the two paths just described, makes corrective modifications of the data received through the measurement path in accordance with data received through the reference path. No adjustments need be made to the optical system per se, which therefore may have a relatively simple construction.

For the film thickness measurement the data acquired will generally be relative reflectance data, relieving the stringent requirement on sample placement needed to obtain absolute reflectance data. The computer immediately converts this to the corresponding absolute reflectance data by the execution of novel programs whose algorithms are derived from the principle (newly propounded herein) that all curves of absolute reflectance versus wavelength are bounded by the same upper and lower limiting curves or wave envelopes for any given film material regardless of film thickness, and that any relative reflectance curve can be converted to its corresponding absolute reflectance curve by a simple proportionating function which relates the tangency points on the relative reflectance curve to the aforesaid wave envelopes. Once this reduction has been accomplished, the determination of film thickness is a straightforward computation.

In other embodiments (not shown herein) the system can operate with the sample measurement path arranged not for direct reflectance as just described but for non-normal incidence reflectance, scattered reflectance, or transmission mode. The data acquisition and correction in such an instance is carried out as described above with the exception that the algorithm for converting from relative to absolute reflectance described above is valid only for thin films of known optical properties on known substrates. The system can be used in a fully automatic manner in a variety of applications. The key feature is the use of a spectrophotometer in combination with a digital computer which can store and compare information, make calculations based upon known theory, make comparisons to standards, plot results, print output results, make a decision based upon them, and cause processes to be modified. Examples of such applications are the measurement of color characteristics of foodstuffs, measurement of thickness of photoconductor layers making use of their optical absorption and reflectance characteristics, the control of color printing processes, measurement of temper of heat treated steel sheets, etc. The computer controlled instrument lends itself to rapid measurement and data interpretation in applications where real time response is needed to control a process or to verify that control is being maintained.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a general schematic representation of a computer-controlled spectrophotometric system for measuring dielectric film thickness in accordance with the invention.

FIG. 2 is a more detailed showing of the fiber-optic sample measurement path included in the apparatus of FIG. 1.

FIG. 3 is a view similar to FIG. 2 illustrating the ability of the measurement path to function effectively despite changes in the angular orientation of the sample.

FIGS. 5A to 5E, when assembled in the manner indicated by FIG. 5, constitute a flowchart of the computer program which is utilized for carrying out the invention in the present embodiment.

FIGS. 7A and 7B, when assembled vertically in the order named, constitute a printout of the DATAI subroutine included in the computer program.

FIGS. 8A through 8F, when assembled vertically in the order named, constitute a printout of the THIKI subroutine included in the computer program.

FIGS. 9A through 9D, when assembled vertically in the order named, constitute a printout of the ORDR subroutine included in the computer program.

FIGS. 10A and 10B, when assembled vertically in the order named, constitute a printout of the THINI subroutine included in the computer program.

DESCRIPTION OF PREFERRED EMBODIMENT

Figure 4:
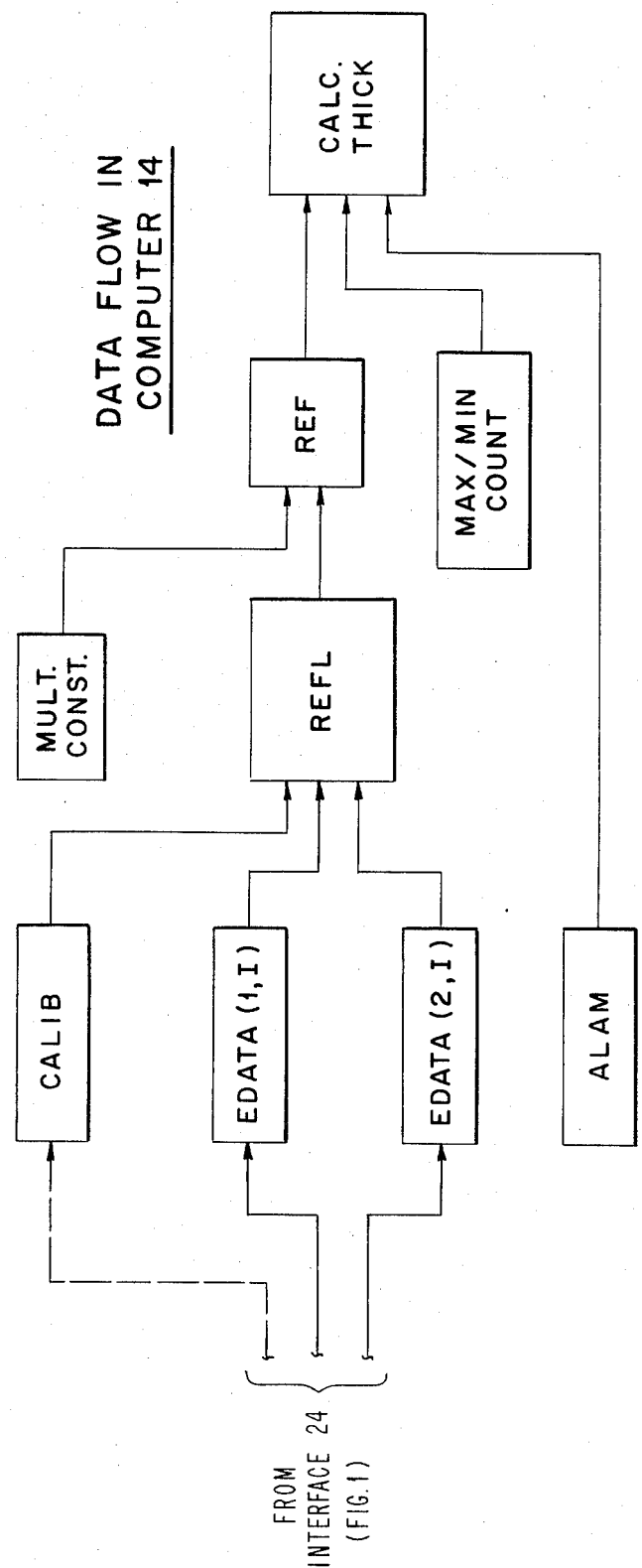
FIG. 4 is a diagramatic showing of the manner in which data of various kinds is entered and processed in the computer to obtain the desired end result, i.e., the thickness of the film being measured.

In FIG. 1 there is illustrated in a general schematic way a spectrophotometric system which is designed to measure the thickness of a thin dielectric film sample F in accordance with the principle of the invention. The system consists of three main parts — an optical apparatus 10, a data acquisition apparatus 12 and a programmed digital computer 14. The optical apparatus 10 is of simple construction, lacking the usual complex adjusting mechanisms (strings, cams, levers, moving slits, etc., or their analog electrical equivalents) that are characteristic of conventional spectrophotometers. The data acquisition apparatus 12 has the important function of transferring to the computer 14 the optical data generated by the apparatus 10 in a chronologically ordered digital form which enables such data to be readily assimilated by the data storing and processing facilities of the computer 14. The power of the computer 14 then is utilized to perform at high speed many necessary functions which otherwise would have to be accomplished in much greater time and with far less facility and accuracy by mechanical movements, analog electrical adjustments and/or human efforts in order to obtain the thickness measurement or other end result desired.

The optical apparatus 10 furnishes a beam of varying-wavelength monochromatic light alternately through two available fiber-optic conducting paths to a photomultiplier 16 (or comparable light detecting device) in the data acquisition apparatus 12. One of these alternate light paths is a reference path 18 which leads directly to the detector 16. The other is a bifurcated measurement path 20, one branch 26 of which conducts the probing light beam to the film sample F whose thickness or other characteristic is to be measured, the other branch 28 of this path then conducting light which is reflected or transmitted by the sample to the photomultiplier 16. The wavelength of the monochromatic light beam varies periodically through a specified range of wavelength values, the rate at which it varies with respect to elapsed time being substantially the same in each of these periods. The arrangement is such that during one period the specified wavelength spectrum is scanned while the light beam is passing through the reference path 18, and during the next period it is scanned while the light beam passes through the measurement path 20, this cycle being repeated without interruption. The output signal of the photomultiplier 16 therefore represents, in electrical analog form, the variation of detected light intensity with respect to wavelength (which in turn is a function of elapsed time) during those nonadjacent periods while the light is passing through the reference path 18, interspersed with the variations of detected light intensity versus wavelength during the intervening periods while the light is passing through the measurement path 20.

The analog output signal of the photomultiplier detector 16 is converted by an analog-to-digital converter 22 to a corresponding train of coded digital signals that are passed to an interface 24, which enters them into the digital computer 14. The operation of the data acquisition apparatus 12 is intermittently timed or synchronized by the optical apparatus 10 (in a manner which will be explained subsequently herein) so that each digital value entered into the computer 14 has both a numerical significance denoting light intensity and a wavelength significance, the relative positioning of these entries with respect to one another determining the wavelength value associated with each numerical entry. With the data being entered in this form, the computer 14 can readily construct tables or "curves" of light intensity versus wavelength for both of the optical paths 18 and 20, from which it is possible to perform all of the calibrating, normalizing and data reducing functions that are needed to determine the thickness of the film sample without imposing any of these burdens upon the optical apparatus 10 or a human operator.

The data acquisition apparatus 12 is of essentially conventional construction and will not be disclosed in detail herein. The fact that it is able to perform the novel and important function described above is due to the manner in which it is operated by the optical apparatus 10 for transmitting to the computer 14 the type of interspersed reference data and measurement data that are needed by the computer for calibrating and normalizing purposes.

The computer 14 is preferably, but not necessarily, a small or medium-scale computer such as an IBM Type 1130 data processing system, for example, which is programmed to perform a variety of operations upon the raw data fed into this computer by the data acquisition system 12. The program under which the computer 14 operates has a number of novel subprograms, the most significant of which are considered herein under two functional headings: (1) calibration and normalization, and (2) data reduction. These subprograms enable the computer 14 to perform at electronic speeds and without human intervention many functions that otherwise must be accomplished by the use of much slower instrumentalities and techniques. The computer is able to "capture in flight," as it were, the time and wavelength-based reference and measurement data generated by the optical apparatus 10, storing this data in a manner such that the wavelengths associated with the various optical entries are denoted by the relative positions or addresses which these entries assume when they are stored in the computer memory. From these stored tables of light intensities and wavelengths, the computer program (to be described hereinafter) will derive all of the correctional information and computed data needed to achieve the desired end result, which in this case is to determine the thickness of the dielectric film sample F. The system as it presently is being practiced can measure film thicknesses up to 50,000 angstroms with a precision of within 10 A throughout most of this range.

Referring now to FIG. 2, which shows in magnified form the part of the measurement path 20 which lies in the vicinity of the film sample F, the path 20 in this particular embodiment of the invention comprises a bifurcated fiber-optic bundle having an initial entrance branch 26 for conducting the incident light to the sample F and a subsequent exit branch 28 for conducting the light reflected from the sample and its substrate (not shown) to the light detecting means (e.g., photomultiplier 16, FIG. 1). The fibers in the junction 30 of the two branches or legs 26 and 28 have a "randomized" distribution, the fibers belonging to branch 26 being interspersed as evenly as possible with those belonging to the branch 28. There is Substantially no coupling between the input fibers in bundle 26 and the output fibers in bundle 28 in the absence of a sample or other reflecting surface at the junction 30.

An advantage of using fiber optics in the light guiding path 20 is that only the light impinging the sample F at or near normal incidence is collected by the fibers in branch 28. Light impinging the sample at non-normal angles of incidence is reflected away from the fiber optics in junction 30 and is therefore not collected by the fibers in branch 28. This allows substantial variations in the orientation of the film sample F as depicted in FIGS. 2 and 3, respectively, and eliminates the need for critical placement of the sample.

Up to this point in the description attention has been centered upon the basic operating principle of the invention which involves sending a beam of variable-wavelength monochromatic light in alternate periods through a reference path 18 and a measurement path 20 to the photomultiplier 16, and relatively little attention has been given to the details of the optical apparatus which causes the light beam to alternate between paths in this fashion. The reason for presenting the description in this manner is that it is important to understand in the first instance how the alternating-path light guiding technique enables the system to allocate all of its calibrating, adjusting and correctional functions to the digital computer 14, thereby relieving the optical apparatus of these functions. This in turn enables the system to utilize an optical apparatus 10 of simple, low-cost design and construction which may operate at much higher speed than conventional spectrophotometers inasmuch as the only essential tasks it now has to perform are to generate variable-wavelength monochromatic light and cause the same to pass alternately through the two light-guiding paths 18 and 20 during successive periods of wavelength variation. By understanding the aim of the invention, which is to subject the entire adjusting, calibrating, and correctional burden of the system to the power of the digital computer 14, one is able to appreciate how this simplification of the optical equipment can be accomplished while at the same time achieving superior performance in comparison with prior systems.

Referring again to FIG. 1, the optical apparatus includes a polychromatic light source 32, which preferably is a type of lamp having a built-in reflector-lens system, such as would be used ordinarily for illuminating fiber-optic bundles in optical card reading devices. It is preferred that the lamp 32 be energized by filtered direct current to eliminate short-term variations in its filament temperature and thus in its spectral output. The lamp 32 furnishes light having a span of wavelengths throughout the visible spectrum. This light passes through certain corrective filters 33 and 34 (the purpose of which will be explained hereinafter) and enters the common end or junction of a split fiber-optic bundle 36. The functions of the respective legs or branches of this split bundle 36 will be described presently.

The heart of the optical apparatus 10 is a variable-wavelength monochromator in the form of a rotating, generally opaque disk 38 having a semicircular variable-wavelength interference filter 40 mounted concentrically therein. The wavelength of light transmitted by the filter 40 at a given stationary point varies with the angular position of the filter relative to that point. In an exemplary system of this kind which presently is in use, the transmission wavelength of the filter 40 varies through a range of approximately 4000 to 7000 A over an angular span of about 159°. If sampling of the transmitted light beam is assumed to occur every three degrees over that span, this provides 54 sampling points, with a change of about 60 A in the transmitted light beam's wavelength for each sampling point after the first. In practice it is not feasible to sample over the full 180° span, due to transitional anomalies which can be expected to occur at the extreme end zones of the filter.

The filter 40 presently being used is a Visible Circular Variable Filter that is available as a stock item from the Optical Coating Laboratory, Inc., Santa Rosa, California. Since the range of wavelength variation over the usable span is less than a full octave, the measurement of film thickness may become difficult in a small part of the thickness measurement range (e.g., 1200 to 1400 A in the case of silicon dioxide films). This difficulty may be overcome with suitable programming of the computer, as described hereinafter, or else by using a more expensive filter covering a complete octave.

When the filtered light from the source 32, FIG. 1, enters the fiber-optic bundle 36, it contains illuminating components of all wavelengths in the usable spectrum. This light divides through a number of parallel branches 42 to 46 of the bundle 36. The fibers of the several branches are randomized in the common entrance portion of the bundle 36, so that no one branch has a preponderance of its light coming from a particular part of the lamp filament whose temperature differs from that of other parts of the filament.

The branches 43 and 44 are the paths for conducting the multiwavelength polychromatic light to the filter 40. During one-half of its rotation the filter 40 receives light from path 43, and during the other half of its rotation it receives light from path 44. While the filter 40 is transmitting light from one of these two paths 43 and 44, the opaque portion of the disk 38 blocks the light coming from the other one. The light beam which is transmitted by the filter 40 in each of these alternating periods has a wavelength which varies at the rate of about 20 A per degree of filter rotation through the range indicated above.

The fiber-optic branches 42 and 45 conduct light to an outer portion of the disk 38, which has a series of timing holes 48 extending circumferentially in alignment with the ends of the branches 42 and 45. These holes 48 are spaced uniformly along an arc whose angle coincides with the angle subtended by the usable region of the filter 40. As the series of holes 48 moves past the exit end of fiber optic 42 or 45, as the case may be, the intermittent passage of light through these holes will determine the timing of the sampling points which, as stated above, occur about once every three degrees of rotation. The manner in which such timing or synchronization occurs will be described presently.

Instead of employing the timing holes 48 and the cooperating fiber optics 42 and 45, an optical incrementing encoder which is commercially available may be utilized. Such an encoder will increase the number of sampling points that are available.

The exit end of the fiber optic 46 is aligned circumferentially with a starting hole 50 in the disk 38. As the hole 50 moves into registry with the exit end of fiber optic 46, a new cycle of wavelength variation commences, each such cycle including in one half thereof a period during which the filter 40 transmits light from one of the illuminating branches 43 and 44, followed by a period in the other half-cycle in which it transmits light from the other of these branches.

Positioned behind the rotating disk 38 is a stationary opaque member 52 in which there is formed a row of small rectangular slits 54, 55, 56 and 57, which are aligned respectively with the ends of the fiber-optic branches 42, 43, 44 and 45. These fiber-optic end portions are formed into a configuration conforming with that of the slits. A hole 58 in stationary member 52 is positioned for periodic alignment with the starting hole 50 in disk 38. Behind the slits 55 and 56 are positioned, respectively, the forward end or entrance of the fiber-optic reference path 18 and the forward end or entrance of the branch 26 of the bifurcated fiber-optic measurement path 26, these forward ends being shaped to conform with the slits 55 and 56.

It is apparent that as the filter 40 rotates past the exit end of branch 43, FIG. 1, a light beam of varying wavelength is passed through the reference path 18 to the photomultiplier detector 16. Similarly, as the filter 40 rotates past the exit end of branch 44, a light beam of varying wavelength is passed through the branch 26 to the sample F, from which it is reflected through branch 28 to the photomultiplier detector 16. The slits 55 and 56 and the cooperating portions of the fiber optics 43 and 44 are small enough so that at any given instant the light being transmitted through either one of these slits from the filter 40 is substantially monochromatic. It is understood, of course, that in practice the members 38 and 52 would be positioned much closer together than represented in FIG. 1, which is only a schematic showing.

Although the foregoing description implies that the light from the source 32 is split into separate beams, one of which is transmitted through the slit 55 in the form of varying-wavelength monochromatic light during one-half of the rotation of the disk 38, and another of which is transmitted through the slit 56 as varying-wavelength monochromatic light during the other half of the rotation of disk 38, the result is the same as though a single beam of varying-wavelength monochromatic light were being switched alternately to the paths 18 and 20 in synchronism with the cyclic repetition of the wavelength variation. Conceptually, therefore, the action that takes place will be viewed herein as though it were occurring in the manner last described.

The rotating variable filter 40, being an interference filter, has the unwanted property of passing integer multiples of the desired frequency. To eliminate any problem that otherwise would be caused by this phenomenon, the filters 33 and 34, FIG. 1, are employed. The function of filter 33 is to prevent the transmission of near-ultraviolet light through the infrared region of the filter 40. Filter 33 has a very sharp cutoff around 3500 A in the ultraviolet portion of the spectrum. To augment this effect, a paint or stain may be applied to the red end of the rotating filter 40 to attenuate any ultraviolet light received there without having any detrimental effects at the blue end. A lemon yellow glass stain has been found satisfactory for this purpose. The filter 34 is a smoothing filter to prevent a peaked, noisy response in the green region of the spectrum and a falling off in the red and blue regions due to the characteristics of the photomultiplier 16 and light source 32. Commercially available absorption filters have been used satisfactorily for these purposes.

Phototransistor units 60, 62 and 64 placed behind the openings 54, 57 and 58, respectively, in member 52 respond to light transmitted through these openings for producing appropriate timing or synchronizing signals in conductors 66, 68 and 70, respectively, leading to an interface unit 24. (Unit 24 could be pulsed alternatively by an angular encoder.) A starting pulse in line 70 marks the beginning of a new pair of successive wavelength-varying periods, during one of which the reference path 18 is illuminated, and during the other of which the measurement path 20 and sample F are illuminated. In each of these periods the timing pulses in line 66 or 68, as the case may be, cause the response of photomultiplier 16 to be sampled at regularly occurring time intervals. The wavelength of the light received by photomultiplier 16 will be identical at correspondingly numbered sampling points of the respective periods. Hence, the sampled data passed by the interface 24 to computer 14 enables the latter to compare, for each sampled wavelength, the response of the system to light reflected from the sample with its response to light of the same initial intensity transmitted independently of the sample.

Despite the beneficial effects of the filters 33 and 34 and the randomization of the split fiber-optic bundles, there are inevitable differences in the intensities of the light emitted by source 32 and transmitted by filter 40 at various wavelengths and the corresponding responses of the photomultiplier 16 at different wavelengths in the same period. In addition to this nonuniform wavelength transmissibility, there may be slow changes in overall performance caused by changes in the charactersticis of the system components due to aging, such as declining emissivity of the light source 32 or reduced overall sensitivity of the photomultiplier 16. Only the interference filter 40 can be relied upon to retain its properties unchanged. In the present system, instead of requiring the optical apparatus or a human being to make the necessary calibrations and adjustments to compensate for these periodic and aperiodic anomalies, this entire responsibility is placed upon the digital computer 14, which is able to deal with the situation in a far more expeditious fashion than was heretofore possible.

FIG. 4 is a data flow diagram that represents schematically the manner in which items of data are stored and processed within the computer 14, FIG. 1, in accordance with the invention. In describing these operations, reference will be made to the storage and processing of data as though all of this action were taking place within an assemblage consisting of registers, counters and arithmetic units constructed as separate hardware units. While it is convenient to think of the operation in these terms, it should be kept in mind that FIG. 4 actually is intended to depict actions that occur within a programmed general-purpose computer, which uses storage locations with changeable addresses for these purposes. Subsequently herein there will be presented a more detailed showing of the programmed method by which these functions are accomplished by the computer 14.

Basic to the concept of computer-controlled spectrophotometry disclosed herein is the system's capability of generating, storing and operating upon two sequences of digital values, one sequence representing in numerical form the sampled responses of the data acquisition apparatus 12, FIG. 1, to monochromatic light of various wavelengths when the same is passed through the reference path 18 directly to the light detector 16, and the other sequence representing the sampled responses of the apparatus 12 to monochromatic light of the same respective wavelengths and intensities when the same has been passed into the measurement path 20 and then reflected or transmitted from the sample F to the detector 16. In FIG. 4 these two sets of stored numbers are designated EDATA (1,I) and EDATA (2,I), respectively. Thus each of these two data sets represents the output of photomultiplier 16 for the series of wavelengths sampled under control of the timing holes 48, FIG. 1 (or of an equivalent angular encoder). In some cases each path may be sampled several times over several rotations of disk 38 in order to minimize the noise effects by summing and averaging the inputs for each point. The respective wavelengths corresponding to the timed sampling points are represented by another string of stored numbers designated ALAM in FIG. 4. This set of numbers does not change with time and need be measured only once for any given variable-wavelength filter 40 and timer, using a suitable set of single-wavelength interference filters for calibration of the sampling wavelengths. To correct for different attenuations of transmitted light in the two paths 18 and 20, a fourth string of numbers designated CALIB, FIG. 4, is stored in the computer 14. This set of correctional factors is measured only once, using a sample of known transmission or reflectance (e.g., bare silicon).

Unique data reduction methods are employed in the disclosed system to determine from the various sets of stored values described hereinabove, first, the relative reflectance or relative transmission data as a function of wavelength, then the absolute reflectance or transmission data, and finally the calculated thickness or other measured attribute of the sample F. It should be noted that all of the data sets EDATA (1,I), EDATA (2,I), ALAM and CALIB are created and processed as digital value representations, this being the inherent mode of operation of the disclosed system. Conventional spectrophotometers are inherently designed to operate in analog mode and their outputs generally are not amenable to rapid digital data processing methods. It is possible, but neither fast nor convenient, to obtain digital outputs from conventional spectrophotometers.

Referring again to FIG. 4, the data sets EDATA (1,I), EDATA (2,I) and CALIB enter into a calculating operation which yields as its output a set of relative reflectance values, designated REFL, for the various sampled wavelengths. Specifically, the measured EDATA (2,I) values are divided respectively by the reference EDATA (1,I) values, and the results are multiplied respectively by the path length calibrating factors CALIB to obtain the respective REFL values. The division of EDATA (2,I) by EDATA (1,I), when corrected for path length differences, yields the proportion of incident light reflected from the sample at each of the sampled wavelengths, i.e., the relative reflectance REFL.

In the conventional spectrophotometric method of measuring film thickness, relative reflectance is the final output of the apparatus, and the determination of film thickness then must be accomplished by tedious human calculations, which are prone to error since they rely upon the correct human identification of maximum and minimum points in the curve of relative reflectance versus wavelength and do not involve any other check points in the graphical data. The present system is a very significant improvement over the conventional method, not only because it greatly speeds up the computation of film thickness from the acquired reflectance data but also because it utilizes a large number of additional check points between the extrema of the curve in order to improve the accuracy of the thickness calculation.

Figure 6:
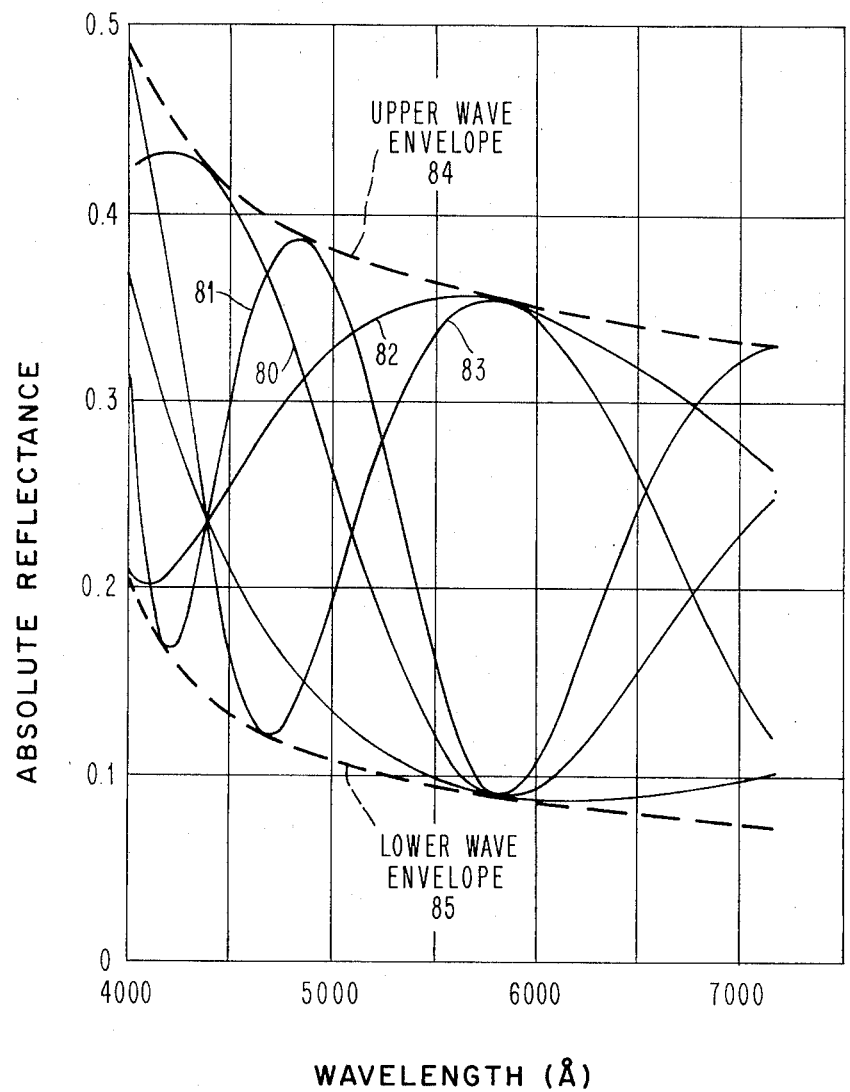
FIG. 6 is a set of graphs showing the relationship between the wavelength of the monochromatic incident light and the absolute reflectance of the sample for films of different thickness made of the same material.

According to the present method, the relative reflectance values REFL, FIG. 4, are converted automatically to absolute reflectance values REF by a simple arithmetic process which is based upon the discovery that all absolute reflectance curves such as 80, 81, 82 and 83, FIG. 6, for films of a given material having different thicknesses are tangent to or bounded by common upper and lower limiting curves or wave envelopes 84 and 85. Since relative reflectance values are proportional to absolute reflectance values, the relative reflectance values REFL can be converted to the corresponding absolute reflectance values REF by multiplying REFL by whatever constant is necessary to bring the relative reflectance curve into tangential relationship with the envelope curves 84 and 85 FIG. 6 (or at least one of these curves, as explained later herein).

The fact that absolute reflectance curves for films of the same material having different thicknesses are bounded by the same wave envelopes may be deduced from the equation for absolute reflectance given below:

Reflectance = $[ R_1^2 + R_2^2 + 2R_1R_2 \cos(2\beta - \phi) ]/[ 1 + R_1^2R_2^2 + 2R_1R_2 \cos(2\beta - \phi) ]$ where $\beta = (2\pi dN_1)/\lambda$ $d$ = film thickness $\phi = \tan^{-1} (2N_1K_2)/(N_1^2 - N_2^2 - K_2^2)$ $R_1^2 = [(N_1 - N_0)/(N_1 + N_0)]^2$ $R_2^2 = [(N_2 - N_1)^2 + K_2^2]/[(N_2 + N_1)^2 + K_2^2]$ $N_1$ = index of refraction for film $N_2$ = index of refraction for substrate $N_0$ = ambient index of refraction $K_2$ = extinction coefficient Analysis of this equation shows that all curves of absolute reflectance versus wavelength must be bounded by envelope curves which are produced by setting the cosine term equal to +1 and −1, respectively.

When the sampled data points REF for the curve of absolute reflectance versus wavelength are obtained, the following equation then is solved explicitly for the film thickness at each data point:

Thickness = $(\lambda/4\pi N_1) (\phi + 2\pi (ORD) + \cos^{-1} [REF (1+R_1^2R_2^2) - R_1^2 - R_2^2/2R_1R_2 (REF - 1) ] )$ where ORD = fringe order, i.e., a count of the number of maximum-minimum variations (or to be more accurate, tangency points) through which the curve theoretically would have gone from its beginning at infinite wavelength to the point in question.

The fringe order number ORD is unknown but can be determined relatively easily by a systematic trial-and-error procedure, making use of the fact that if all measurements were perfect, the thickness determined at each data point would have the same value, if the proper order number were chosen for each point. Thus, an initial estimate is made of the order number for the point at one end of the available curve; then the thickness is calculated at all points to see how much deviation or "scatter" there is among the various values obtained. After this trial has been made, the initial order number is incremented by 1, and the thickness is recalculated for all points to compare the scatter with that previously obtained. This procedure is repeated until a set of results with minimum scatter is obtained, at which time it is concluded that the thickness thus calculated is the true film thickness. All of these calculations, complex as they seem, are performed at extremely high speed and with ease by the computer 14 and therefore take very little time.

The above procedure works very well for films that are not less than 700 A thick. Films thinner than this are analyzed by the use of a curve fitting technique, identified hereinafter as THINI, which is one of the subroutines that are available in the programming of the computer 14. Another special situation may arise where the film thickness is between certain values (such as 1250 to 1400 A for silicon dioxide) due to the fact that the reflectance curves for films in this thickness range do not manifest any extrema for incident light in the wavelength span from 4000 to 7000 A. This problem can be handled either by increasing the wavelength span (using a more expensive rotatable filter 40) or by modification of the programming as indicated hereinafter.

A program under which a system of this kind has been successfully operated consists of FORTRAN and FORTRAN-callable subroutines, the principal ones of which are shown in FIGS. 7A to 10B, inclusive. A flowchart depicting that portion of the program which includes these principal subroutines is presented in FIGS. 5A − 5E. The remaining subroutines of the program are not specifically disclosed herein, since their construction would be apparent to a programmer of average skill.

The subroutines discussed herein are as follows:

DATAI — FIGS. 7A and 7B — This is a FORTRAN-callable subroutine written in assembly language of a particular computer. The example of DATAI shown herein was written for an 1130 data processing system hookup. Its function is to acquire data from the two paths 18 and 20, FIG. 1, as described hereinabove and store the resulting data sets EDATA (1,I) and EDATA (2,I), FIG. 4.

THIKI — FIGS. 8A to 8F — This is a FORTRAN program which performs the major part of the data processing operations involved in determining the film thickness, calling the subroutines DATAI and ORDR as required. The various functions of THIKI are indicated on FIGS. 5A, 5C, 5D and 5E of the flowchart, or stated more generally, they comprise the operations indicated in FIG. 4 commencing with the calculation of the relative reflectance values REFL. THIKI also handles the special situations which arise whenever the thickness of the measured film sample lies in a range such that its reflectance curve has no maximum or minimum point within the usable wavelength span of the incident light.

ORDR — FIGS. 9A to 9D — This subroutine performs various graphic analysis functions, indicated on FIG.5B and part of FIG. 5C, which will be described in more detail hereinafter. It also is able to detect when the film is too thin or be calculated by the THIKI subroutine, and it calls the THINI subroutine under these circumstances.

THINI — FIGS. 10A and 10B — This subroutine performs a second-order least-squares fit to the reflectance curve and does a table lookup of the film thickness.

Referring now to FIG. 5A, wherein the boxes containing the flowchart steps are individually numbered for convenience, the steps 600 and 601 relate to the data acquisition subroutine DATAI. After an initial wait for the start command (step 600), the system executes the DATAI subroutine for aquiring the data sets EDATA (1,I) and EDATA (2,I), FIG. 4, from the reference path 18 and sample measurement path 20, respectively. A typical program for carrying out these DATAI functions, written in the assembly language of the IBM 1130 data processing system, is shown in FIGS. 7A and 7B.

The program now exits from the DATAI subroutine and enters the THIKI subroutine, an exemplary FORTRAN programming of which is shown in FIGS. 8A–8F. Referring back to FIG. 5A, the first step in determining film thickness (602) is to divide the sample path data EDATA (2,I) by the reference path data EDATA (1,I). In most instances this will be done as part of the procedure for measuring the relative reflectance of an unknown sample which is undergoing measurement. During the initial calibration of the system, however, a sample whose reflectance characteristic is already known (bare silicon, for example) is measured in order to compare its known reflectance values at the various sampling wavelengths with the respective quotients obtained in step 602, which theoretically should equal these known values.

At step 603, FIG. 5A, the system inquires whether it is presently operating in a calibration mode or a measurement mode. When operating in the calibration mode, the values obtained in step 602 are divided by the respective values which they should have had (step 604) and the results are stored as calibration factors (step 605). The operation then loops back to the starting step 600. If the system is operating in its measurement mode, the operation branches from the decision point 603 to step 606, where the quotients obtained in step 602 are respectively divided by the calibration factors obtained in the previously executed step 605 in order to obtain the corrected values of relative reflectance, denoted as REFL in FIG. 4.

At step 607, FIG. 5A, the system makes a rough estimate of the number of "fringes" (i.e., maxima) that are present in the reflectance curve, in the sense of detecting whether this number is low or not low. If it is low (as may be the case in small parts of the measurable thickness range), then the number of data sampling points is reduced in order to minimize the possibility of noise signals being mistaken for extrema. If the number of fringes is not low, then there is much less likelihood of spurious noise pulses being mistaken for extrema, and the normal number of sampling points may be used. The program makes this determination at step 608.

Then at step 609, the system determines whether smoothing of the data obtained in step 606 is desired, the decision being made in accordance with the rough estimate obtained in step 607. The part of the THIKI program which deals with the steps numbered 607–609, FIG. 5A, is shown at the bottom of FIG. 8B and in FIG. 8C. If data smoothing is desired, any of several standard techniques is employed for this purpose as indicated at step 610. If smoothing is not desired, step 610 is omitted.

Figure 5C:
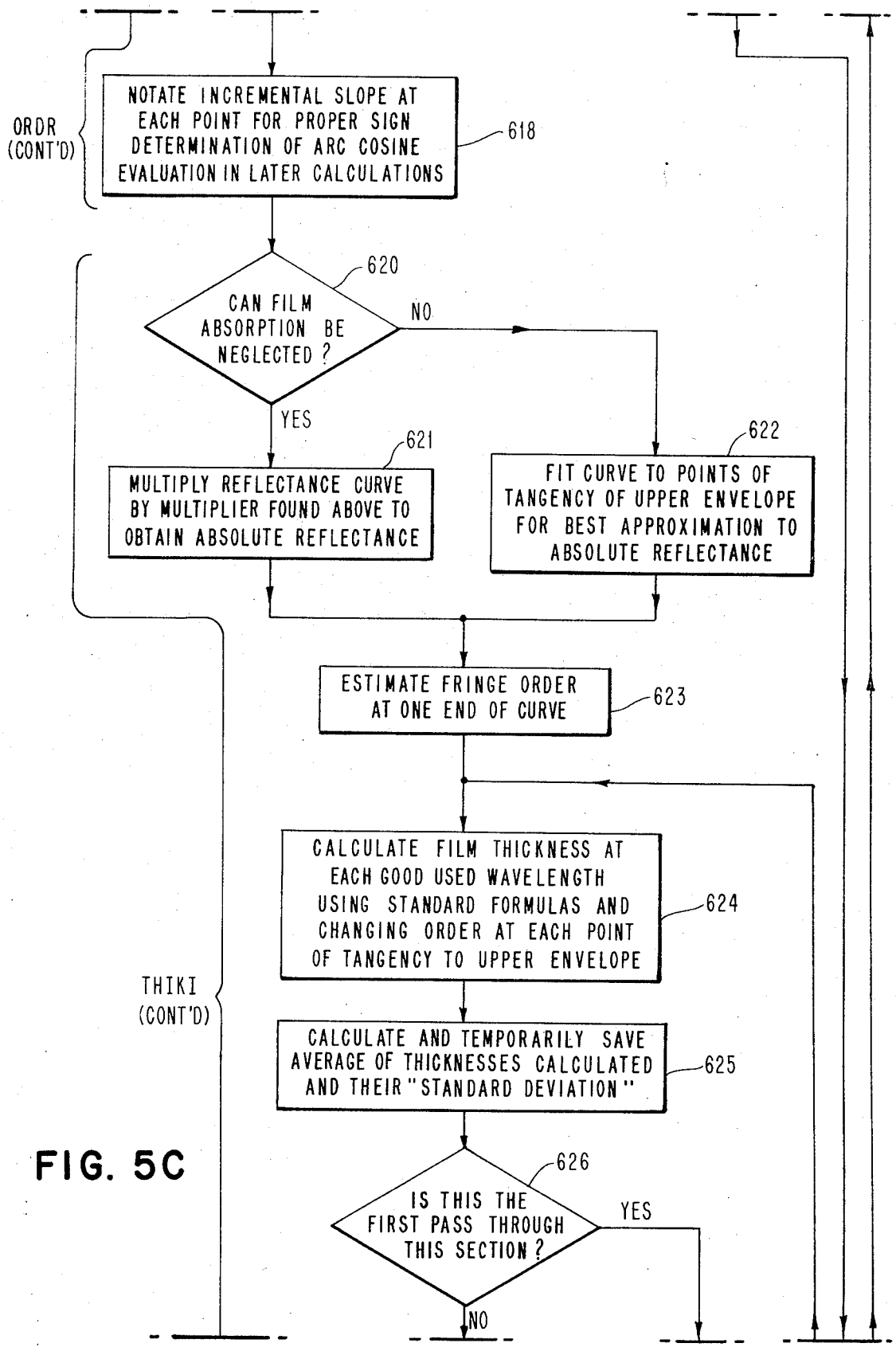

At this point the system exits for a time from the THIKI subroutine and enters the ORDR subroutine, FIGS. 9A–9D, the functions of which are indicated generally in boxes 611–618 of the flowchart, FIGS. 5B and 5C. First the operation proceeds to step 611, FIG. 5B, at which the program makes one of several checks for bad points in the data. Such a point may be recognized by the erractic behavior of the slope or derivative of the curve in its vicinity. In the next step 612 a check is made for data points taken at wavelengths where the particular material in the sample is known to be highly absorbing, for example, the blue end of the spectrum in the case of photoresist coatings.

The system now is ready to find the multiplying factor or constant for converting the relative reflectance (REFL) curve to the absolute reflectance (REF) curve. This is done at step 613, if it can be accomplished at all. If the material sample happens to be in a thickness range where no extrema exist in the wavelength span being used, an exact determination of the constant is not possible. At step 614 it is ascertained whether any points of tangency have been found. A point of tangency will be found close to each one of the extrema, if there are any. If such points are found, they are notated at step 615 of the procedure.

If no tangency points were found, the system then must determine whether this was due to the fact that the film was thinner than say, 700 or 750 A, or because its thickness fell within some other range where no extrema exist. This determination is made at step 616. If the slope of the reflectance curve is positive, the film thickness is in the very thin range, and a special subroutine THINI (the programming of which is shown in FIGS. 10A and 10B) is called to apply a curve fitting technique to the data. If the reflectance curve slope is negative, the film thickness is in the other critical range, and the operation proceeds to step 617 of the THIKI subroutine, where a special calculation is performed to determine a multiplier at the end of the reflectance curve which is closest to being a point of tangency on one of the pre-established wave envelopes. As mentioned above, this step 617 may be omitted if the rotating interference filter 40, FIG. 1, has a sufficiently wide wavelength span to insure the inclusion of at least one extremum in the reflectance curve.

The mathematical procedure for determining the proper multiplier constant is not difficult. The wave envelope values for the respective sampling wavelengths will have been determined and stored beforehand in the computer 14. The sampled, good values of the reflectance curve, as corrected, are then divided by the respective reflectance values for each of the wave envelopes to find a quotient which most nearly approaches 1. This quotient, inverted, subsequently becomes the multiplier constant for the whole curve.

After step 615 or 617 has been performed, as the case may be, the operation advances to step 618, FIG. 5C, where a notation is made of the incremental slope at each sampled data point. This information will be needed subsequently in the thickness calculation (the mathematical formulas for which were presented hereinabove) for determining the proper sign to be used in the arc cosine evaluation. Step 618 is the last phase of the ORDR subroutine.

Having completed this step, the procedure now reenters the THIKI subroutine, and at step 620, FIG. 5C, a branching decision is made according to whether the film's absorption of light at any of the wavelengths can be ignored. This, of course, depends upon the material in the sample being measured and is information that must be supplied to the system beforehand. Some dielectric materials such as $SiO_2$ have negligible absorption. Others such as photoresist may absorb heavily in one particular part of the wavelength spectrum. If a nonabsorbing material is being measured, the relative reflectance curve values (REFL) are multiplied by the multiplier found in step 613 or 617, FIG. 5B, this action occurring at step 621, FIG. 5C. If an absorbing material is being measured, the multiplier is determined on the basis of fitting the reflectance curve to the upper wave envelope only (step 622), because it must be made tangent to at least one envelope, and the upper one is the more important.

The absolute reflectance curve values having been found, there now commences the cut-and-try process described hereinabove for finding the true order numbers of the fringes in this reflectance curve, which will be needed in the thickness calculation. Depending upon the number of tangency points previously determined (step 615, FIG. 5B), an initial estimate of the fringe order at one end of the curve is made by the system (step 623). Then, at step 624, a trial calculation of film thickness is made at each wavelength sampling point where there is a good reflectance value, using well-known formulas as given hereinabove and changing the order number at each point of tangency to the upper envelope.

At step 625, FIG. 5C, the average of the several thickness values calculated in step 624, along with their standard deviation (or "scatter"), are calculated. If this is the first pass through the thickness calculation (decision point 626), then the starting order guess is incremented (step 627, FIG. 5D), and the process loops back to step 624, FIG. 5C. The reason for this is that there must be at least two sets of thickness calculations for comparison purposes. Steps 624 and 625 now are repeated to derive a new set of thickness values, together with their average value and the standard deviation.

Figure 5D:
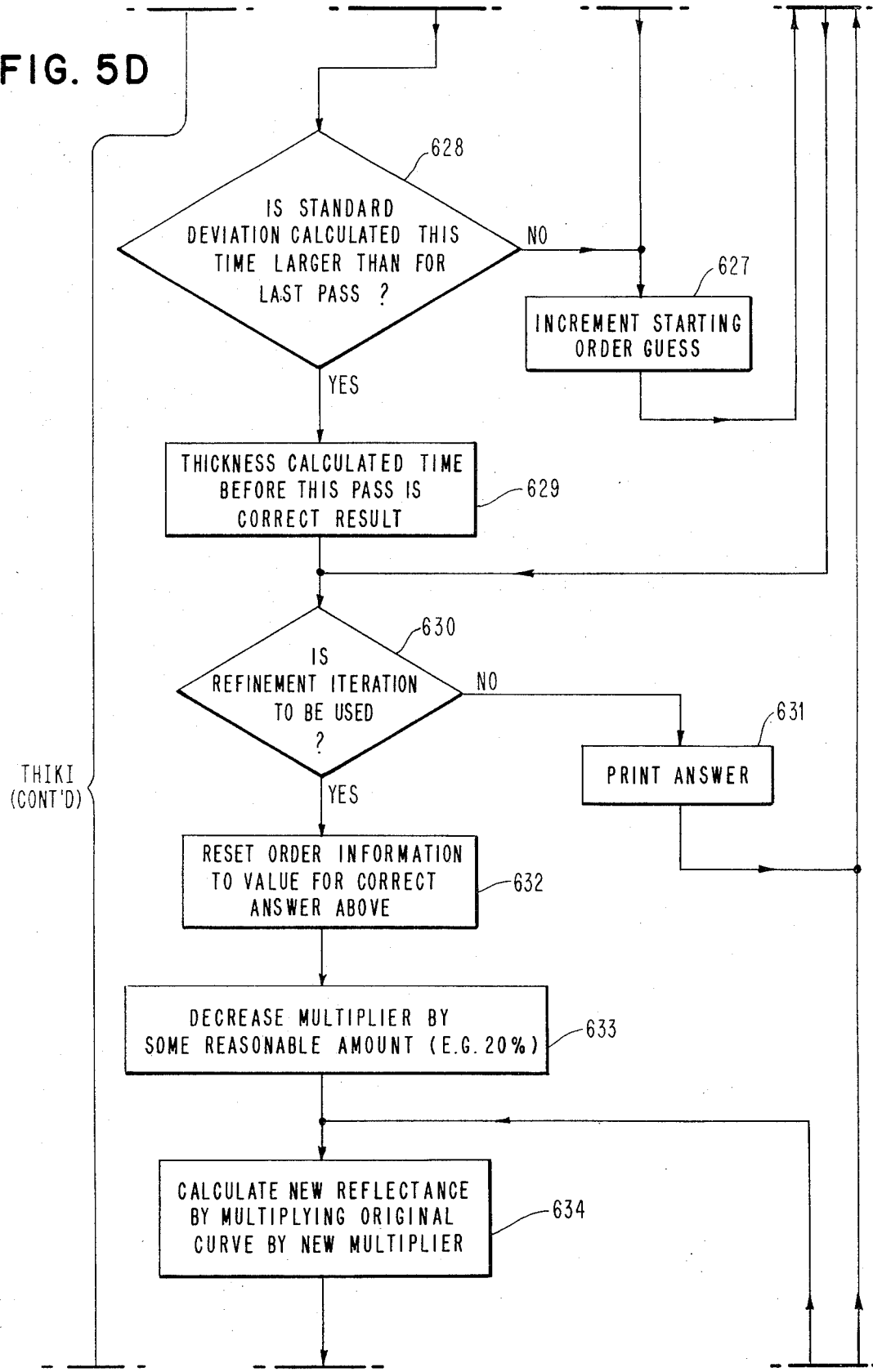

At step 628, FIG. 5D, the current standard deviation is compared with the one previously obtained. If there has been an improvement in accuracy, as reflected by a reduction of the deviation value, another try is made for still greater accuracy by again incrementing the starting order guess (step 626) and repeating the calculation in steps 624 and 625. Ultimately a condition is reached where the deviation value starts to increase after having progressively declined. This indicates that the immediately preceding thickness calculation was the correct one, since it involved the least amount of scatter. The program now exits from the thickness calculation loop 624–628 to step 629, where the average thickness calculated in the pass just preceding the current one is preserved as the ostensibly correct result.

The operation by now has progressed to a point where the answer may be printed out, if no refinement of the calculations is desired. This is a decision made by the operator, who has set a console switch to a chosen position indicative of either refinement or no refinement. At step 630 the setting of this console switch is tested and if no refinement is called for, the thickness value saved at step 629 is printed out as the final answer (step 631). The system then is initialized in preparation for another thickness measuring operation upon a new sample (step 600, FIG. 5A).

Figure 5E:
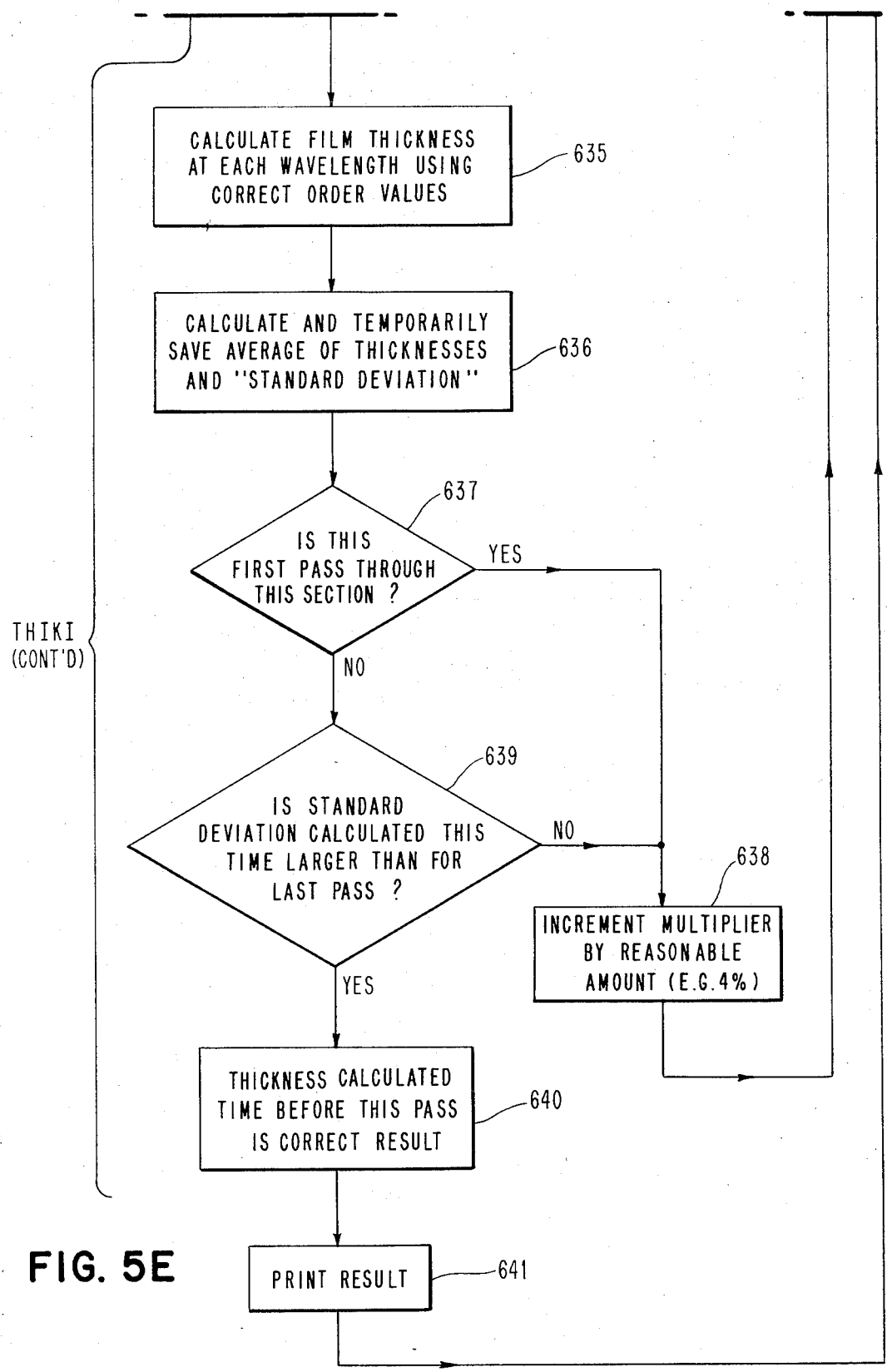

If refinement of the thickness calculations is called for at step 630, FIG. 5D, then an iteration involving steps 632 to 640, FIGS. 5D and 5E, is initiated. The purpose of this iteration is to make certain experimental, small, vertical displacements of the REF curve to see whether such action further reduces the amount of deviation or scatter in the thickness calculations throughout the wavelength sampling span, thereby indicating a truer fit of the absolute reflectance curve to the data. At step 632 the starting order number last calculated (step 627 in the last pass) is reset to the next lower number, which is the correct one for the sample under consideration. Now a new set of absolute reflectance values (REF) is obtained by a process which involves, first, decreasing the multiplier constant previously used (step 621, FIG. 5C) by some initial trial amount such as 20% (step 633, FIG. 5D). The relative reflectance values REFL found in step 606, FIG. 5A (as modified by the subsequent correctional steps) now are multiplied by this new constant to calculate a new curve or table of reflectance values for the sample (at step 634).

The steps 635, 636 and 637 which now follow are essentially the same as the steps 624, 625 and 626 which were previously executed in order to minimize the scatter. A tentative set of thickness values, together with an average thickness value based thereon and a standard deviation value, are calculated. On the next pass through this smoothing iteration, the previous multiplier is incremented by a small amount such as 4% (steps 637 and 638), and a new set of thickness values is calculated (steps 634–636). The current and previous deviations are compared (step 639), and if there has been an improvement, the multiplier again is incremented by 4% (step 638), and another try is made to reduce the deviation still further. When no further improvement is possible (steps 639 and 640), the final thickness value is printed (step 641).

It will be appreciated that all of the operations depicted in FIGS. 5A – 5E are performed in a length of time which is insignificant in comparison with the time consumed by a conventional spectrophotometric method of measuring film thicknesses, and the results are far more accurate since more data points are being considered and are being checked more thoroughly than before. Inasmuch as these operations are conducted by a highly flexible and versatile digital computer, the optical apparatus is freed of all tasks except the simple one of acquiring the raw optical data, uncorrected for any variations of light intensity with either the periodic changes of wavelength or the aperiodic aging of the system components, such factors now being taken care of by the programmed internal processes of the computer, along with additional refining techniques that are feasible because the spectrophotometer now has the power of the computer available to it.

Beside its use as a film thickness measuring tool, the disclosed system will lend itself to other applications of spectral analysis, such as examining the reflectance characteristics of printing inks or other light-reflecting substances or the absorption characteristics of light filtering substances. The disclosed system moreover is capable of modification to suit special thickness measuring conditions. For example, if all of the measurements to be made are known to fall within certain limits, it may be feasible to eliminate certain routines such as THINI or the special calculation denoted as step 617 in FIG. 5B. If the number of data points to be used by the system is fixed beforehand instead of being determined by the system itself as at step 608, FIG. 5A, this will eliminate the need for the software and hardware which are involved in this determination. Various other modifications and improvements apparent to those skilled in the art can be effected without departing from the scope and spirit of the invention.

What is claimed is:

1. A method of operating a spectrophotometric system under the control of a digital computer to determine an attribute of a given material sample which is subject to spectral analysis, said method comprising the steps of:

a. conducting to said sample, during each of a series of nonadjacent time periods, a beam of variable wavelength monochromatic light furnished by a given source, the wavelength of said beam varying at a given rate through a specified range of wavelength values during each of said periods;

b. conducting to a light detector in said system the light which comes from said sample when it is impinged by said beam;

c. conducting directly to said light detector, during time periods intervening the periods specified in step a, the beam of monochromatic light furnished by said source, the wavelength of which varies at said given rate through said specified range during each of said intervening periods;

d. converting the output of said detector during each of the periods specified in steps *a* and *c* to a sequence of stored digital values representing the respective intensities of light detected at a series of regularly timed intervals throughout the respective one of said periods;

e. operating said computer to derive from the sequences of values stored during any pair of successive steps *a* and *c* a new sequence of numbers representing the calculated optical responses of said sample to incident light having the wavelength of said variable-wavelength beam at each of said timed intervals under a hypothetical condition where it is assumed that the incident light has uniform intensity for all wavelengths in said range and all system components have constant operating characteristics; and f. operating said computer to determine from said derived sequence of numbers the attribute of said sample which is being measured.

2. A method of operating a spectrophotometric system under the control of a digital computer to determine the thickness of a film of given dielectric material, said method comprising the steps of:

a. conducting to said film, during each of a series of nonadjacent time periods, a beam of variable-wavelength monochromatic light furnished by a given source, the wavelength of said beam varying at a given rate through a specified range of wavelength values during each of said periods;

b. conducting to a light detector in said system the light reflected from said film as it is illuminated by said beam;

c. conducting directly to said light detector, during time periods intervening the periods specified in step *a*, the beam of monochromatic light furnished by said source, the wavelength of which varies at said given rate through said specified range of values during each of said intervening periods;

d. operating said computer to convert the output of said detector during each of the periods specified in steps *a* and *c* to a sequence of stored digital values representing the respective intensities of light detected at a series of regularly timed intervals throughout the respective one of said periods;

e. operating said computer to derive from the sequences of digital values stored during any pair of successive steps *a* and *c*, as described above, a series of numbers each representing the relative reflectance of said film when illuminated by monochromatic light having the wavelength of said beam at a respective one of said timed intervals under a hypothetical condition where it is assumed that the incident light has uniform intensity for all wavelengths in said range and all system components have constant operating characteristics; and f. operating said computer to determine from said relative reflectance values the thickness of the film being measured.

3. In a spectrophotometric system having data acquisition means for generating digital value-representing signals in response to sensed optical inputs and also having a digital computer provided with data storage means and data processing means which are responsive to the output of said data acquisition means, a method of operating said system to measure the thickness of a film sample of given dielectric material, comprising the steps of:

a. conducting to said film sample, during each of a series of nonadjacent time periods, a beam of variable-wavelength monochromatic light furnished by a given source, the wavelength of said beam varying at a given rate through a specified range of wavelength values during each of said periods;

b. conducting to a light-sensitive input device in said data acquisition means the light which is reflected from said sample when it is impinged by said beam;

c. conducting directly to said light-sensitive device, without impinging said sample and during time periods intervening those specified in step *a*, the beam of variable-wavelength monochromatic light furnished by said source, the wavelength of which varies at said given rate through said specified range of values during each of said intervening periods;

d. operating said computer to receive and store in said data storage means, at regularly timed intervals in each of the time periods described in *a* and *c*, the digital values generated by said data acquisition means, thereby to store at least two sets of numbers, one set representing the respective intensities of light detected by said light-sensitive device at said timed intervals during a period when the variable-wavelength light beam is being conducted directly to said device, and the other set of numbers representing the respective intensities of light detected by said device at said timed intervals during a period when the variable-wavelength light beam is impinging said film sample;

e. storing in said data storage means a set of numbers representing the respective wavelengths of the light beam at the respective ones of said timed intervals throughout any of said periods;

f. operating said data processing means to derive from all of the stored number sets recited hereinabove a table of values representing the manner in which the relative reflectance of said film sample varies with respect to the wavelength of the incident light beam under a hypothetical condition where it is assumed that the incident light has uniform intensity for all wavelengths in said range and all system components have constant operating characteristics;

g. operating said data processing means to multiply the relative reflectance values in said table by a factor which will convert the curve of relative reflectance versus wavelength to a curve which is at least approximately tangent to predefined upper and lower wave envelopes that bound the curves of absolute reflectance versus wavelength for all films of the given material having thicknesses within a predetermined thickness range; and h. operating said data processing means to compute from the multiplied reflectance values the thickness of said film sample.

4. A computer-controlled spectrophotometric system for measuring a property of a given material sample which is subject to spectral analysis, said system comprising:

a. cyclically operable illuminating means for furnishing a beam of monochromatic light, the wavelength of which varies periodically at a given rate through a specified range of wavelength values;

b. a light detector;

c. first light guiding means for conducting said light beam through a first path directly to said light detector during nonadjacent ones of the periods in which the wavelength of said light beam undergoes variation through said range of values;

d. second light guiding means effective during periods intervening said nonadjacent periods for conducting said light beam through a second path having an initial portion that directs said beam to said sample and a final portion that conducts light from said sample to said detector;

e. signal converting and data transfer means responsive to the output of said detector and operating in a timed relationship with the cyclic operation of said illuminating means for producing sequences of digital value representations, each such sequence denoting the variation of detected light intensity with respect to the wavelengths of said beam at a series of regularly timed intervals within each of said periods; and f. a digital computer having data storage means for storing the sequences of digital value representations produced by said means e during at least two successive periods when said detector is receiving light through said first path and said second path, respectively, and having data processing means to calculate from such stored data the optical responses which would have been obtained from said sample at said timed intervals if the conditions had been such that the intensity of the variable-wavelength incident light were uniform at all wavelengths in said range and the operating characteristics of the components of said system were constant, thereby providing a new set of corrected values from which the measurement of said sample property can be accurately determined.

5. A spectrophotometric system as set forth in claim 4 wherein said illuminating means a comprises the following elements:

a1. a source of polychromatic light;

a2. first light conducting means for directing polychromatic light from said source to an exit point optically aligned with but spaced from the entrance to said first path in said first light guiding means;

a3. second light conducting means for directing polychromatic light from said source to an exit point optically aligned with but spaced from the entrance to said second path in said second light guiding means; and a4. a rotatable variable-wavelength interference filter positioned so that it rotates alternately past the entrance to said first path and the entrance to said second path, the wavelength of the monochromatic light transmitted by said filter to either path depending upon the angular position of said filter.

6. A spectrophotometric system as set forth in claim 5 wherein each of said light conducting means and light guiding means is a fiber-optic bundle.

7. A system as set forth in claim 6 wherein said second light guiding means (d) is a bifurcated fiber-optic bundle, one branch of which constitutes said initial portion, and the other branch of which constitutes said final portion.

8. A spectrophotometric system as set forth in claim 4 which includes timing means under the control of said illuminating means for causing said signal converting and data transfer means to sample the output of said light detector at predetermined wavelength increments during each of the periodic variations of the monochromatic beam wavelength.

9. A spectrophotometric system as set forth in claim 4 wherein said computer is programmed to divide each of the values in the sequence that was received through said second path by the correspondingly positioned value in the sequence that was received through said first path.

10. A spectrophotometric system as set forth in claim 4 wherein said second light guiding means is arranged so that light passed through said initial portion thereof is reflected from said sample and passed through said final portion thereof to said detector.

11. A system as set forth in claim 10 wherein said computer is programmed to divide each of the values in the sequence that was received through said second path by the correspondingly positioned value in the sequence that was received through said first path, thereby to yield said sequence of corrected values representing the relative reflectance of said sample at the respective wavelengths assumed by said beam at said timed intervals.

12. A system as set forth in claim 11 wherein said computer is programmed to multiply each of the values in said rlative reflectance sequence by a factor which will cause the multiplied values to define a curve that is tangent to at least one of a pair of predetermined wave envelope curves which bound all curves of absolute reflectance versus wavelength for the given material, thereby providing a set of absolute reflectance values for said respective wavelengths.

13. A system as set forth in claim 12 wherein said computer is programmed to calculate from said sequence of absolute reflectance values the thickness of said sample.

14. In a computer-controlled spectrophotometric system of the kind wherein a light detector is arranged to respond to light of periodically varying wavelength which is received alternately through a sample measurement path and a direct reference path, the combination comprising:

a. a rotatable variable-wavelength filter having a light-transmitting portion with an angular span not exceeding 180° positioned so that it transmits light into the respective entrances of said measurement path and said reference path during different periods in its rotation, the wavelength of the light transmitted into either of said paths at any instant depending upon the angular position of said filter relative to the path entrance;

b. a polychromatic light source; and c. means providing light conducting paths leading from said light source to exits on the side of said filter which is farthest from said measurement path and reference path entrances, said path exits being respectively aligned optically with said entrances, whereby the rotation of said filter causes polychromatic light emerging from said path exits to be transmitted by said filter as monochromatic light of varying wavelength to said measurement path and said reference path, respectively, during different periods in the rotation of said filter.

15. The combination set forth in claim 14 wherein said means c is a split fiber-optic bundle having branches leading respectively to said exits and having a common portion adjacent to said light source wherein the fibers of said branches have a randomized distribution.

* * * * *